(12) United States Patent
Venne

(10) Patent No.: US 11,796,205 B2
(45) Date of Patent: Oct. 24, 2023

(54) SYSTEMS AND METHODS OF OPTIMIZING HVAC CONTROL IN A BUILDING OR NETWORK OF BUILDINGS

(71) Applicant: BRAINBOX AI INC., Montreal (CA)

(72) Inventor: Jean-Simon Venne, Montreal (CA)

(73) Assignee: BRAINBOX AI INC., Montreal (CA)

( * ) Notice: Subject to any disclaimer, the term of this patent is extended or adjusted under 35 U.S.C. 154(b) by 0 days.

(21) Appl. No.: 16/969,723

(22) PCT Filed: Feb. 19, 2019

(86) PCT No.: PCT/CA2019/050195
§ 371 (c)(1),
(2) Date: Aug. 13, 2020

(87) PCT Pub. No.: WO2019/157602
PCT Pub. Date: Aug. 22, 2019

(65) Prior Publication Data
US 2021/0003308 A1    Jan. 7, 2021

Related U.S. Application Data

(60) Provisional application No. 62/632,057, filed on Feb. 19, 2018.

(51) Int. Cl.
*G05B 19/042* (2006.01)
*F24F 11/63* (2018.01)
(Continued)

(52) U.S. Cl.
CPC ............ *F24F 11/63* (2018.01); *G05B 19/042* (2013.01); *G06N 5/022* (2013.01); *G06N 20/00* (2019.01); *G05B 2219/2614* (2013.01)

(58) Field of Classification Search
CPC .. F24F 11/63; F24F 11/64; F24F 11/58; F24F 11/62; G06N 20/00; G06N 5/022; G05B 19/042; G05B 2219/2614; G06F 17/40
(Continued)

(56) References Cited

U.S. PATENT DOCUMENTS

2012/0310376 A1* 12/2012 Krumm ................. G05B 15/02
                                                               700/31
2014/0207721 A1   7/2014 Filson et al.
(Continued)

OTHER PUBLICATIONS

International Search Report & Written Opinion dated May 3, 2019 in connection with International Application No. PCT/CA2019/050195.
(Continued)

*Primary Examiner* — Michael W Choi
(74) *Attorney, Agent, or Firm* — Norton Rose Fulbright Canada LLP

(57) ABSTRACT

A system and method for managing all of the HVAC components of a building so they operate like one optimized ecosystem. The system and method optimize HVAC operations by predicting HVAC requirements based historical data, weather forecasts and/or occupancy rates. Historical data includes data obtained from an observation phase in which sensor data is collected from the building and used to train the algorithms utilized in the system and method and thereby providing for a more accurate prediction of HVAC requirements. In some embodiments, the systems and methods are configured to predict future required operational parameters using an artificial intelligence engine trained using historical data from the HVAC components.

16 Claims, 23 Drawing Sheets

(51) Int. Cl.
*G06N 20/00* (2019.01)
*G06N 5/022* (2023.01)

(58) Field of Classification Search
USPC ........................................... 700/276
See application file for complete search history.

(56) References Cited

U.S. PATENT DOCUMENTS

| | | | |
|---|---|---|---|
| 2016/0091904 A1* | 3/2016 | Horesh | G06Q 50/06 |
| | | | 700/276 |
| 2016/0305678 A1* | 10/2016 | Pavlovski | F24F 11/62 |
| 2016/0327295 A1* | 11/2016 | Ward | F24F 11/30 |
| 2017/0075510 A1 | 3/2017 | Bentz et al. | |
| 2017/0199515 A1* | 7/2017 | Bhat | G05B 9/03 |
| 2020/0041966 A1* | 2/2020 | Patel | G05B 15/02 |
| 2020/0151836 A1* | 5/2020 | Lingras | G06Q 10/06 |
| 2021/0034024 A1* | 2/2021 | Patel | G05D 23/1919 |
| 2021/0080915 A1* | 3/2021 | Yan | G05B 15/02 |

OTHER PUBLICATIONS

CIPO, Office Action for CA Application No. 3090718 dated Apr. 8, 2021.
CIPO, Office Action for CA Application No. 3090718 dated Aug. 20, 2021.
CIPO, Office Action for CA Application No. 3090718 dated Mar. 10, 2022.

* cited by examiner

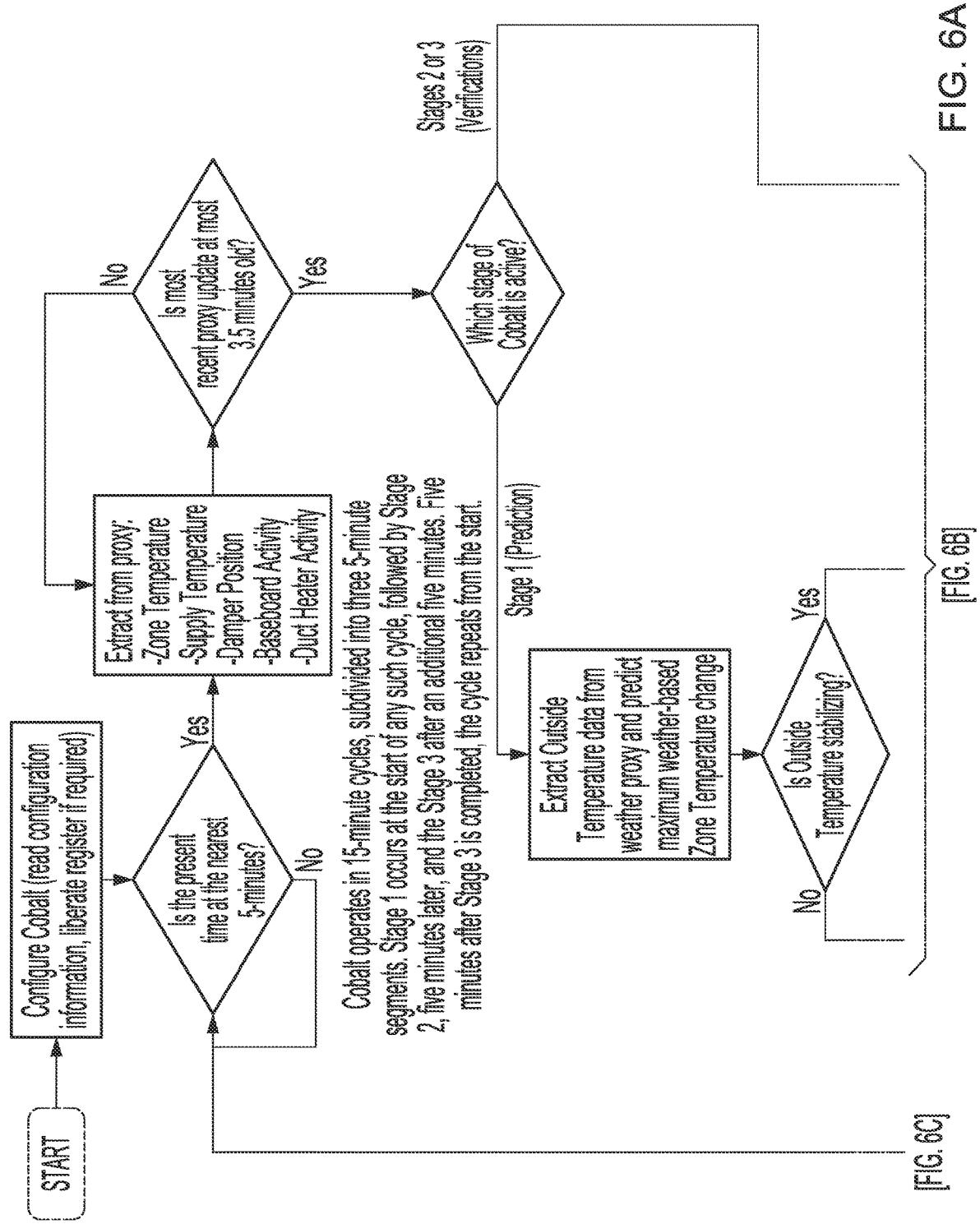

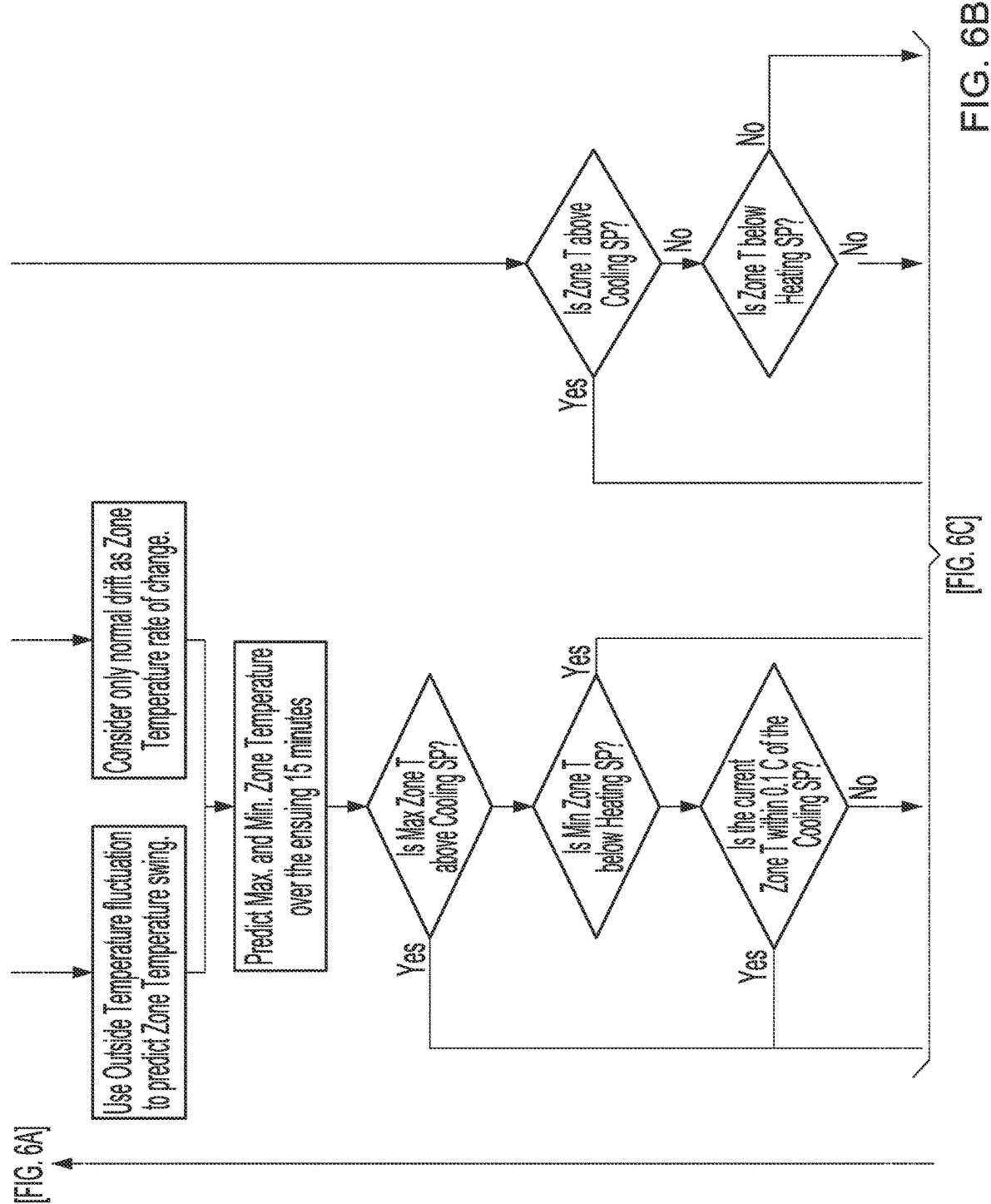

SYSTEMS AND METHODS OF OPTIMIZING HVAC CONTROL IN A BUILDING OR NETWORK OF BUILDINGS

FIELD OF THE INVENTION

The subject matter disclosed generally relates to building management or building automation. More specifically, it relates to systems and methods of optimizing all of the HVAC control systems and sub systems in a building or network of buildings so they operate as one optimised ecosystem.

BACKGROUND OF THE INVENTION

Building management systems (BMS) or building automation systems (BAS) are systems used in buildings to manage HVAC (heating, ventilation and air conditioning), lighting, power, security, elevators and other building systems.

HVAC constitutes around 40% of a commercial building's total energy and it is now becoming a priority to achieve HVAC energy reduction, but energy efficient HVAC is not simple to achieve or sustain. Even new "state of the art" commercial HVAC systems lose operational efficiency post installation due to the way they are designed, installed and maintained.

Traditionally, HVAC systems are considered as a group of independent mechanical equipment. Each pump, chiller, tower and air handling unit are designed to be turned on, run at a fixed speed and turned off. This way of thinking leads to a logic of equipment components that are designed to operate efficiently in isolation, and a building management systems (BMS) that control the equipment by turning it on and off automatically. Operating data that typically resides in the typical BMS is not easily accessible by building operators. If operating data is available, it's usually in the form of unformatted streams of data points—a format that is incompatible with performance measurement or problem diagnosis.

Management of HVAC by BMS or BAS generally involves the use of thermostats or other sensors provided at various locations in the building, with each thermostat acting as a sensor measuring the temperature at its specific location. Typically, thermostats include a target temperature range, (i.e., a target temperature, accompanied by a value that is added to or subtracted from the target temperature and thus defining what is called the acceptable temperature band). This temperature range can be changed by room occupants or building operators. When the measured temperature in the room of the thermostat is out of the target temperature range, the thermostat sends an instruction to the HVAC equipment to start heating or cooling the room. This responsive management of room temperature is inefficient and not cost effective. Improved efficiency and cost effectiveness can be obtained if occupancy of the room or other environmental variables which affect the thermal targets within the building are considered in the control of the HVAC system. In addition to improving efficiency and reducing costs, HVAC control that would be predictive as opposed to responsive would improve comfort and provide additional energy savings.

In order to link temperature control with room occupancy, many existing BMS or BAS require replacing existing thermostats with thermostats with occupancy or vacancy sensors or adding occupancy or vacancy sensors to specific rooms and linking these additional sensors to HVAC control to use this data. In large buildings, there can be hundreds of thermostats. The cost and effort of replacing simple thermostats with thermostats with occupancy sensors can be significant and is a major hurdle for the adoption of this technology in large buildings.

HVAC control by many existing BMS or BAS is based on a fixed control sequence designed for a typical day of the actual season and not on the actual conditions. Such HVAC control does not take into account wide fluctuations in temperature that can occur on a day to day basis within a particular season. Existing BMS and BAS generally do not keep a detailed history of each and every data point; typically, only trend logs are kept in a database for a limited time in order to avoid needing infrastructure necessary to store extremely large data sets. This however prevents any behavior-learning analysis that would be needed to understand how the thermal energy moves within a specific building and what can be done to optimize this movement. Only a large quantity of points with months of detailed value (e.g., raw data in a large history dataset) could provide enough details to analysis these thermal energy behaviors that are unique to a building.

There have been attempts to improve BMS or BAS by connecting the system to an additional device to better manage the use of energy in HVAC systems. For example, there are light fixtures that detect room occupancy, or intelligent thermostats that detect room occupancy and other variables and can change their target temperature depending on these variables or depending on forecasted needs. Some of these thermostats can also predict that a future target temperature is about to be reached and instruct the HVAC system to change its operation based on this forecast. These systems are however costly and require physical modifications of the building.

Other attempts including those set forth in U.S. Pat. No. 10,094,586 which describes a method for controlling temperature in a thermal zone within a building, comprising receiving a desired temperature range for the thermal zone; determining a forecast ambient temperature value for an external surface of the building proximate the thermal zone; using a predictive model for the building, determining set points for the HVAC system associated with the thermal zone that minimize energy use by the building; and, controlling the HVAC system with the set points to maintain an actual temperature value of the thermal zone within the desired temperature range for the thermal zone. This method however does not consider the thermodynamics of the building nor does it consider all HVAC operations that impact environmental conditions of a building or zones therein.

SUMMARY OF THE INVENTION

An object of the present invention is to provide systems and methods for optimizing HVAC control dynamic thermal equilibrium process in a building or network of buildings. In accordance with an aspect of the invention, there is provided system for managing all of the HVAC components of a building, the system comprising an edge computing device in communication with sensors of environmental variables in the building and with the HVAC components; a remote server in communication with the edge computing device over a network, wherein the edge computing device and the remote server each comprises a memory and a processor to execute instructions which cause the remote server to collect data from the edge computing device; determine, based on the collected data, a forecast of needs in heating, cooling and ventilation for a plurality of zones within the building; send the forecast to the edge computing device, and which cause the edge computing device to collect data from sensors in the building; receive the forecast from the remote server; and instruct the HVAC components on how to operate.

In accordance with another aspect of the invention, there is provided a system for managing HVAC components of a building, the system comprising an on-site edge computing device in communication with sensors of environmental variables in the building and with the HVAC components of the building; the edge computing device comprising a memory and a processor to execute instructions which cause the edge computing to collect data from sensors in the building; run a dynamic modulation algorithms to determine HVAC instructions; and instruct the HVAC components on how to operate.

In accordance with another aspect of the invention, there is provided an edge computing device for managing HVAC components of a building comprising a memory and a processor to execute instructions which cause the edge computing to collect data from sensors in the building; run a dynamic modulation algorithms to determine HVAC instructions; and instruct the HVAC components on how to operate; wherein the edge computing device is configured to communicate with sensors of environmental variables in the building and with the HVAC components of the building.

In accordance with another aspect of the invention, there is provided A method for managing HVAC components of a building, the method comprising collecting data from sensors of environmental variables in the building by an edge computing device provided in the building; sending at least a portion of the data to a remote server by the edge computing device; determining, based on the collected data, a forecast of needs in heating, cooling and ventilation for the entire building; based on the forecast, instructing the HVAC components on how to operate, by the edge computing device.

In accordance with an aspect of the invention, there is provided a method for managing HVAC components of a building, comprising: using an on-site edge computing device operatively connected to the HVAC components, receiving data from the HVAC components, wherein data comprises sensor readings, operational parameters and temperature set points; determine, based on the collected data, a forecast of needs in heating, cooling and ventilation for a plurality of zones within the building; predict future required operational parameters using an artificial intelligence engine trained using historical data from the HVAC components; determine modulation of operational parameters necessary to maintain temperature within temperature set point using dynamic modulation algorithms; and instruct HVAC components.

In accordance with another aspect of the invention, there is provided a method for modeling thermodynamic behavior of a building: using an on-site edge computing device operatively connected to HVAC components of the building, mapping all data items of the HVAC components; receiving data from the HVAC components, wherein data comprises sensor readings, operational parameters and temperature set points; preparing a thermodynamic model of the building; predicting future required operational parameters using the thermodynamic model of the building to maintain temperature set points; comparing actual future required operational parameters with the predicted future operational parameters; and adjusting the thermodynamic model of the building based on the comparison.

BRIEF DESCRIPTION OF THE DRAWINGS

Further features and advantages of the present disclosure will become apparent from the following detailed description, taken in combination with the appended drawings, in which:

FIG. 6A to 6C is a flowchart illustrating high level space temperature set points and control bands of the algorithm "Cobalt" in accordance with one embodiment of the invention;

It will be noted that throughout the appended drawings, like features are identified by like reference numerals.

DETAILED DESCRIPTION OF THE INVENTION

Figure 1A:
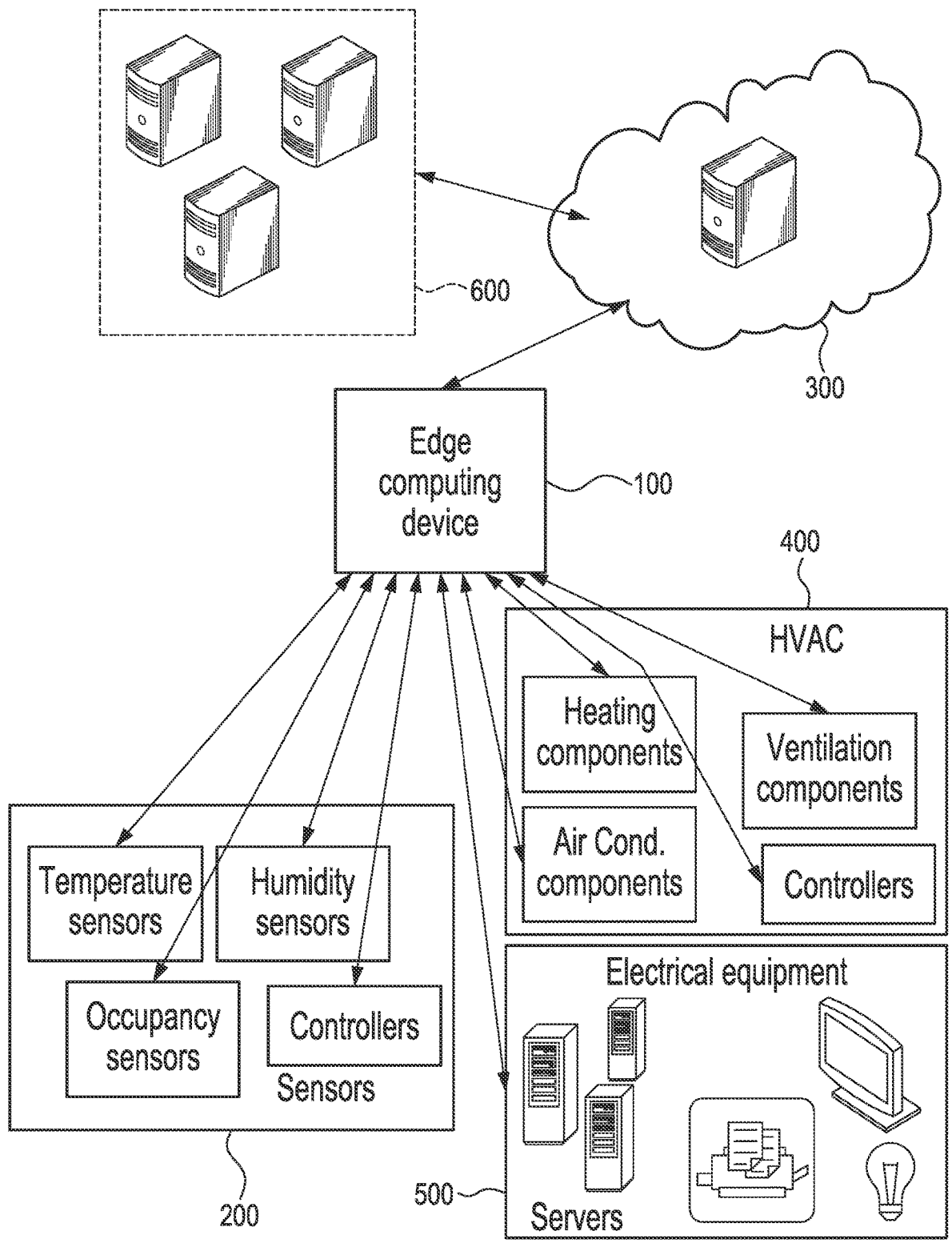
FIG. 1A is a schematic diagram illustrating the system, according to one embodiment of the invention where the edge computing device 100 is in direct communication with the sensors 200 HVAC components 400 and electrical equipment 500.

The optimization of the operation of the Heating, Ventilating and Air Conditioning (HVAC) system(s) in a building or network of building reduces energy consumption leading to a reduction in building operating costs. Predictive and/or more finely tuned responsive control of the HVAC systems can not only improve efficiency but also improve environmental conditions, comfort and/or reduce management time.

The present invention provides systems and methods for optimization of the operation of the HVAC systems and includes methods of predicting HVAC operational requirements based on historical data and/or meteorological forecasts and/or other factors including room occupancy that impact in-door environmental conditions.

The systems and methods of the invention are configured to extract and monitor all data items, i.e. "points" and considers the thermodynamic properties of both the building as a whole and zones therein to predict the value of all data items, i.e. "points" and control each component of the HVAC system to optimize HVAC performance. Components and operating parameters of the HVAC system controlled by the systems and methods of the invention include set points, fan speed, valve openings, damper position, temperature of the cold water, temperature of the hot water, pipe pressure, pump speed, evaporator rate, and compressor pressure, amongst others.

Optionally, the system and methods of the invention may be configured to maintain the thermal equilibrium of the building.

The systems and methods of the invention may be configured to send instructions to the BMS/BAS to adjust operating parameters of one or more or all HVAC components and operating parameters and/or may be configured to send instructions directly to specific pieces of HVAC equipment.

The systems and methods described herein may provide and enable predictive HVAC control. These systems and methods may utilize advanced data processing and/or artificial intelligence including traditional linear, non-liner regression models, supervised learning, unsupervised learning, deep learning and neural network artificial intelligence technics to provide predictive HVAC control systems and methods that are capable of learning. Additionally, in some embodiments these systems and methods integrate and interconnect devices including sensors, and HVAC components, within existing building infrastructure using wired and/or wireless networks. Some of the features described herein may utilize big data systems, machine learning and artificial intelligence, cloud computing technologies, and cloud services, for example.

Predictive control of the HVAC system includes control of one or more HVAC systems based on predicted future outdoor environmental conditions and historic internal features behaviors including but not limited to temperatures, wind speed and direction, cloud cover percent, eclipses, outdoor humidity; time of day; date; sun path; building leak rate derive from features set; thermodynamic patterns derive from historic dataset and predicted occupancy amongst other factors.

In some embodiments, artificial intelligence and machine learning utilizes historical data to predict impact of current and/or anticipated environmental conditions on HVAC system operation and control HVAC system operation based on the predicted impact.

Optionally, the system and method are configured to detect anomalous or abnormal behavior including HVAC system operation needs outside of predicted parameters. In some embodiments, the detection of anomalous or abnormal behavior triggers the systems and methods of the invention to undergo a period of retraining.

In some embodiments, the detection of anomalous or abnormal behavior includes detection of HVAC operations outside of normal operating patterns. Optionally, in such embodiments, the system and method provide an alert that anomalous or abnormal behavior has been detected.

Predicted future outdoor temperature and/or environmental conditions are based on historical data, meteorological forecasts and/or climate pattern cycle including regular cycles such as diurnal or seasonal cycles and quasi periodic events such as El Nino.

In some embodiments, the system and/or methods take into consideration changes in human behavior associated with the weather fluctuation and the seasonal changes, for example, in-door temperature set points may be set higher in the summer to account for lighter weight clothing.

In some embodiments, the system receives forecasts or other information from third party providers including government weather stations. Meteorological forecasts include short range, medium range and long range meteorological forecasts. The weather conditions and forecasts may be updated at regular intervals. In some embodiments, weather information and tracking are updated at fixed intervals, for example, every 1, 5, 10, 15, 20, 30 or 60 minutes. Optionally, in some embodiments, the system and method are configured to use historical data to predict impact of specific weather conditions on HVAC needs for specific parts of the building as zones or rooms with exterior walls and/or windows may be more greatly impacted by outside conditions than interior zones or rooms.

In embodiments which receive meteorological forecasts, HVAC system operations may be adjusted based on these forecasts. For example, in embodiments where the HVAC system comprises multiple HVAC units, individual units may be turned on or off or adjusted based on anticipated need, optionally allowing for the selection of heating and/or cooling units based on anticipated conditions and allowing for the operation of multiple units at part-load if such operation is more efficient than operation of a single unit at full load. In some embodiments, where multiple chillers serve the building the systems and methods may provide for chiller staging. Optionally, chiller staging considers equipment configuration and type, refrigerating capacity, chilled water flow rates, power consumption by water condensers and water tower fans.

In some embodiments, buildings may be pre-cooled or heated in anticipation of changes in temperature thereby optionally allowing for off-peak electricity consumption.

In some embodiments, the system and method are configured to preemptively cool or heat specific areas of a building based on sun position or solar path. The system and method may further be configured to account for shadows, cloud cover and/or reflected sunlight from surrounding structures and/or buildings. Optionally, in some embodiments, the system and method are configured the adjust building air flow patterns in response to sun position or solar path. The system and methods may further be configured such that adjustment of the operation of the HVAC system based on sun position or solar path does not occur when there is cloud cover or cloud cover above a specific level.

The system and method may be further configured to control dampers or shutters to either increase or decrease heat transfer.

Optionally, the system and method are configured to control ventilation and/or air flow to redistribute heat and/or cool air, for example regulate air flow to move cooler air from basement levels to upper levels. In some embodiments, the system and method are configured to regulate intake of outdoor air and optionally to use outdoor air for space cooling, for example, to flush the building with cool outdoor air at night to reduce or avoid cooling during the daytime. The system and method are optionally further configured to redistribute heat and/or cool air only if the redistribution is cost effective or otherwise advantageous.

The system and method may be configured to control HVAC systems based on room occupancy including controlling heating, cooling and ventilation based on actual or predicted occupancy. Optionally, zones or rooms may be preemptively cooled or heated based on predicted occupancy rates. In some embodiments, usage of supply air fans, hood exhaust and make up fans is dependent on actual or predicted occupancy where usage is reduced in unoccupied rooms or zones. The system and method are optionally figured to automatically switch on ventilation system and/or lights if occupants are detected in the room or zone. Optionally, in addition to occupancy the type of occupancy is considered, for example, occupants involved in strenuous activity will impact environmental conditions to a greater extended then occupants who are not active.

Room occupancy may be determined and/or predicted based on historical data, schedules (i.e., scheduled room occupancy), day of the week, etc. Systems and methods of determining room occupancy include those know in the art, motion sensors and PIR sensors amongst others.

In some embodiments, historic room occupancy is determined based on fluctuations in room environmental readings from HVAC sensors including temperature, humidity, and $CO_2$.

In some embodiments, occupancy data is provided by a third party, for example, based on the number of cellular or Wi-Fi connected mobile device.

In some embodiments, historic room occupancy is determined based on changes in energy required to maintain a set temperature.

In embodiments where room occupancy is predicted, HVAC settings can be adjusted to account for number of anticipated occupants to compensate or adjust for heat and/or $CO_2$ generated by the occupants of the space. Optionally, the system and method of the invention control ventilation of a specific space on the basis of controlling for either actual or anticipated $CO_2$ levels. In some embodiments, outdoor ventilation rate is minimized to the rate necessary to maintain acceptable air quality, i.e. $CO_2$ levels. In environments with extreme weather conditions, indoor air is optionally filtered to minimize amount of outdoor ventilation required.

In some embodiments, the system and methods of the invention are configured to control head pressure of water-cooled condensers to improve energy efficiency of air conditioning in part-load conditions. In such embodiments, the system and methods are configured to determine optimal head pressure or calculate a floating head pressure and maintain the optimal head pressure by using variable speed drive controllers or condenser water modulating head pressure valves. The systems and methods of the invention optionally further provide for variable or floating temperature set points of heating hot water (HHW), chilled water (CHW) and condenser water (CW) whereby the temperature (or grade) of the thermal energy is dynamically adjusted (or reset) to minimize the energy consumption of the associated HVAC equipment. For example, the methods and systems are optionally configured to provide the coolest possible water for heating; the warmest possible water for cooling and/or the coolest possible CW for cooling of refrigeration equipment.

In some embodiments, the system and methods of the invention are configured to manage building energy consumption including managing electric consumption during peak demand time thereby reducing costs.

In some embodiments, the system and method of the invention are configured to manage HVAC systems in response to outside air quality and/or air quality within a specific area or zone. For example, the system and method of the invention are configured to control ventilation rate based on measured pollutant level including level of carbon monoxide and/or nitrous oxides in a particular zone or area such as a car park or loading dock. Optionally, the system and method may be further configured to direct flow of outside or indoor air through filters to improve air quality, if necessary.

Optionally, the system and method of the invention are configured to adjust air flow or air intake in response to outside air quality. For example, in some embodiments, outside air is filtered or purified if outside air quality is low such that airborne particles, likes dust, pollen and bacteria are removed. Accordingly, in some embodiments, air intakes are selected based on actual or anticipated air quality.

In systems and methods, where multiple factors are considered in predicting HVAC requirements, individual factors can be weighted. Weighting of factors may be based on historical data and/or anticipated impact.

Optionally, the system and method may be configured to allow building operators to weight or prioritize one or more factors, for example, maximize energy efficiency and/or cost savings. In such embodiments, a user interface may be provided allowing for selection or ranking of priorities.

In some embodiments, the system and method are configured to control HVAC systems to minimize energy expenditure while maintain a minimum comfort in occupied zones and/or areas by taking into account factors that impact perceived comfort level of an occupant including temperature and humidity. For example, set point for temperature and humidity are both adjusted to maintain comfort while reducing energy requirement.

The systems and methods of the invention may be configured for a single building or a network of buildings. In some embodiments, the two or more buildings in the network of buildings are physically connected, for example, by tunnels, enclosed walkways, bridges.

The system and methods of the invention may be configured for retrofit into existing building and be further configured to interface with existing HVAC components. In other embodiments, the system is incorporated into new builds. In new builds, the system and methods are optionally integrated into or are a module of the BMS or BAS.

In retrofits, the system and method may be configured to interact directly with components of the HVAC system, for example in direct communication with the sensors and the actuators/controllers of the HVAC system. In alternative embodiments, the system and the methods communicate directly with the existing master controller. Optionally, the system and the methods may be a combination of direct interact interaction with the master controller and direct communication with components of the HVAC system.

The system of the invention generally comprises an on-site edge computing device in communication with sensors and components of the HVAC system. The on-site edge computing device is further connected to a remote server or cloud server. In some embodiments, both the on-site edge computing device and remote server or cloud server include algorithm modules configured to analyze data. Optionally, the edge computing device is configured to determine the micro and time sensitive parameters and the algorithm module on the remote or cloud server is configured to determine macro and mid or long-term parameters.

In other embodiments, the edge computing device includes an algorithm module configured to calculate both macro and micro parameters. Macro parameters represent the big trends and include forecast and/or prediction values for the next 1 to 8 hours with optionally a +/−15 minutes accuracy. Micro parameters include the forecast values for the next 60 minutes and are the precise value for each command points with optionally an accuracy of +/−2.5 minutes. In such embodiments, the edge computing device can use the macro predictions to define the precise values of each point command in the HVAC system. Optionally, in some embodiment, the edge computing device is configured to keep using the last macro report received until it reaches the end of the 8 hours.

Analysis of sensor data and/or calculation of HVAC parameter changes may be completed on the on-site edge computing device, on the remote server or cloud server or combination thereof. In some embodiments, the system is configured such that processing is switched to the on-site edge computing device if there is no link to the remote server or cloud server.

In one embodiment, referring to FIG. 1A, there is described a system comprising an edge computing device 100 in communication with thermostats of the building, with HVAC components 400 of the building and with a remote server 300. More specifically, there is described a system for managing HVAC components 400 of a building, the system comprising: an edge computing device 100 in communication with sensors 200 of environmental variables in the building and with the HVAC components 400; and a remote server in communication with the edge computing device 100 over a network. The edge computing device 100 and the remote server each comprises a memory and a processor to execute instructions which cause the remote server to: collect data from the edge computing device 100; determine, based on the collected data, a forecast of needs in heating, cooling and ventilation for a plurality of zones within the building; and send the forecast to the edge computing device 100, and which cause the edge computing device 100 to: collect data from sensors 200 in the building; receive the forecast from the third party server 600 via the remote server 300; and instruct the HVAC components 400 on how to operate. Collecting data from sensors 200 comprises collecting data from existing sensors, and instructing the HVAC components 400 comprises instructing existing HVAC components 400, thereby making the method a retrofit.

Figure 1B:
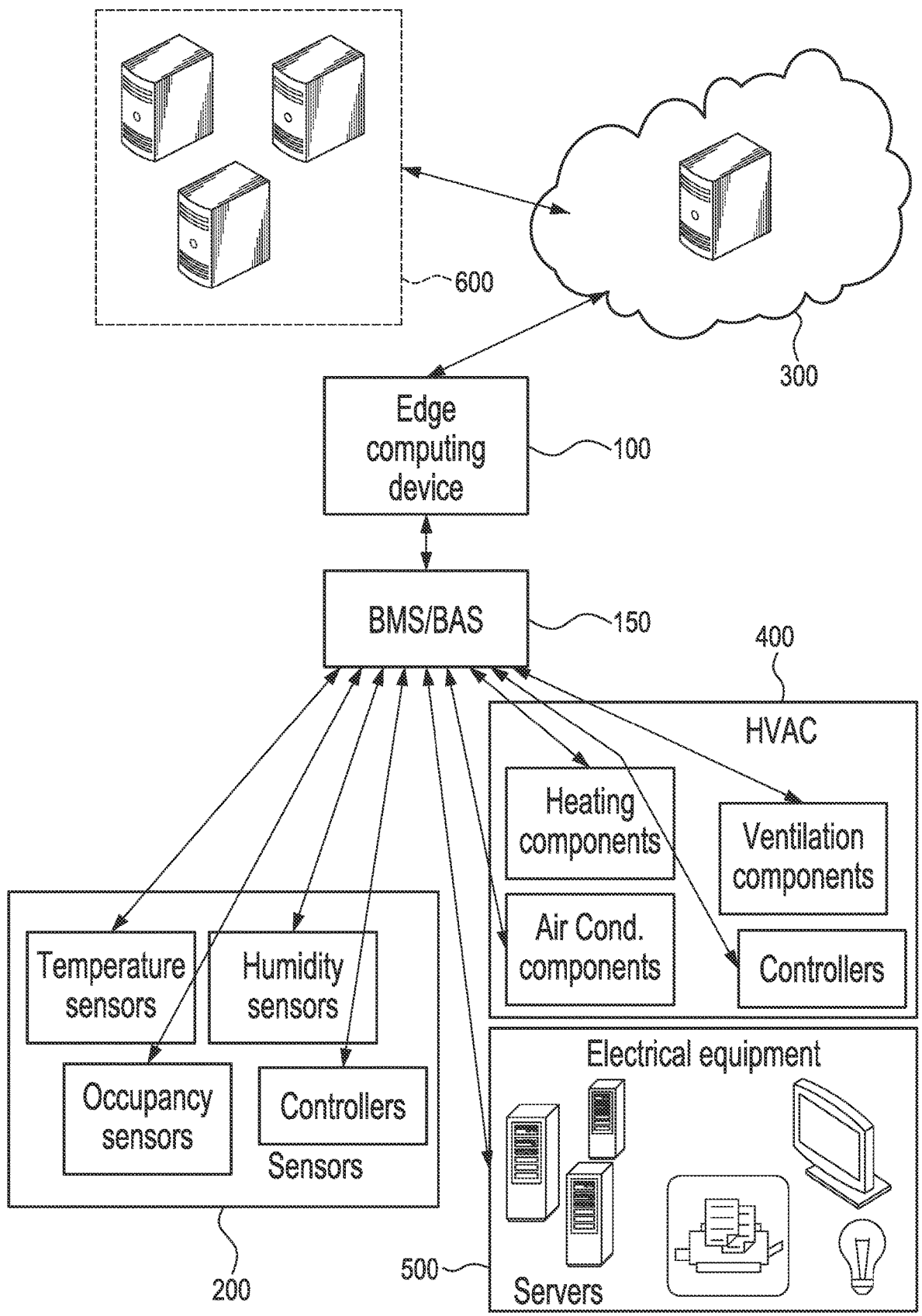
FIG. 1B is a schematic diagram illustrating the system, according to one embodiment of the invention where the edge computing device 100 is in direct communication with the existing BMS/BAS 150.

In an alternative embodiment, referring to FIG. 1B, the system comprises an edge computing device 100 in communication with the existing BMS or BAS 150 and with a remote server 300. Forecasts are provided directly from third party servers 600 to the edge computing device 100 or via the remote server 300 as shown. More specifically, there is a system for managing HVAC components 400 of a building, the system comprising an edge computing device 100 in communication with the pre-existing BMS or BAS 150. The BMS or BAS 150 communicates with sensors 200 in the building and with the HVAC components 400 and acts as an intermediary between the edge computing device 100 and sensors 200 and the HVAC components 400 such that the edge computing device 100 provides control instructions to the BMS or BAS 150 which then communicates with the necessary HVAC components 400. Similarly, sensors 200 communicate with the BMS or BAS 150 which then transmits the data to edge computing device 100.

In a further alternative embodiment, the system comprising an edge computing device 100 in communication with the existing BMS or BAS 150 and one or more sensors 200 and/or one or more HVAC components 400.

Embodiments of the system according to the invention do not require changing thermostats of the building, allowing retrofitting of the system using existing thermostats. An edge computing device 100 can be advantageously provided and made to be in communication with the existing BMS/BAS 150, and/or the sensors 200, the actuators/controllers, and the internet, for low-cost and simple retrofitting of the existing thermostats and HVAC equipment in the building.

The system, as illustrated in FIG. 1A and FIG. 1B, is an IoT (Internet of Things) solution to individually control HVAC components 400 of a building management system (BMS) in order to optimize the efficiency of the whole system. The system can advantageously make use of existing sensors 200 (e.g., thermostats which comprise a thermometer) throughout the building, and of actuators or controllers on the various HVAC components 400 to individually control each one of them, at an individual component level. An edge computing device 100 is in communication both with these sensors 200 and actuators and with the internet (i.e., a remote server 300). By converting data formats, the edge computing device 100 is adapted to receive information from the sensors 200 and transmit to the actuators even though the format of the data is heterogeneous.

A method for controlling the system is provided. The method involves algorithms that predict the needs in terms of heating, cooling and ventilation throughout the building. These productions involve the data acquired from the sensors 200 (air temperature, velocity, humidity and pressure, human presence) and data acquired from the internet (local weather forecast, including sunlight intensity and orientation, and temperature, wind or precipitation). By running analytics on the historic dataset of the building into the program, the program can determine how to control each of the HVAC components 400 to optimize the system (i.e., minimize cost or energy consumption). Electrical equipment 500 can also be controlled in a similar fashion by the edge computing device 100. This applies specially to lighting, the needs of which depend strongly on occupancy, which is measured, and which affects heating or AC needs. This can also apply to other types of equipment having similar requirements and effects, such as industrial equipment, local servers, electrical loads which depend on occupancy (e.g., ornamental equipment), electricity distribution equipment, electricity storage (i.e., battery banks and the like), alarms systems, etc.

The program can be implemented on both the edge computing device 100 and on remote servers 300 (e.g., the cloud) depending on the needs in terms of bandwidth and time reactivity.

Based on the optimization, each HVAC component 400 is instructed, through the edge computing device 100, to modulate its operation. The components can include: air system components (fresh air intake; duct, exhaust and supply fans, night purge, (de-humidification), cooling system components (chillers, compressors, condenser water delivery, head pressure, condensing pressure) and heating system components (boiler, steam pressure or delivery).

A very large number of components are thus controlled in real time based on a high variety and quantity of input data.

Today, large buildings make heavy use of Building Management Systems (BMS) thus making equipment operating conditions more visible to the operators, and also more easily controllable. This visibility focuses all the attention on the monitoring tools and is not concerned by thermodynamic equilibrium within the building. Indeed, the focus of prior art BMS is made on the optimization of individual equipment performance while at the same time dumping more than 50% of a building's thermal energy into the environment. Instead of managing the operating conditions of individual equipment, as in typical BMS, the system according to the invention proposes to manage the energy flow in the building by collecting data from sensors 200 located throughout a building and by managing the heat flow as a whole.

The system according to the invention would have the potential to reduce the inefficiency of the thermal energy in buildings. An edge computing device 100 can be used not only to collect data from sensors 200, but also to connect with every chiller (or any other cooling system component), boiler (or any other heating system component), pump and an entire array of the control points of a building. With this infrastructure capability, advanced algorithms can be deployed by being installed on an easy-to-deploy edge computing device 100 to deliver dynamic optimization of the building base on real-time environmental conditions and the internal load of the building thus keeping all the mechanical systems optimally positioned 24/7. This can be made by connecting the edge computing device 100 with existing equipment (sensors 200, controllers, actuators of HVAC components 400). By putting the intelligence in the edge computing device 100 and not on the equipment (sensors, controllers, actuators), the existing equipment does not need to be replaced and retrofitting is made possible. The deployment of the system according to the invention would eliminate drifting and drastically reduce occupant complaints, equipment alarms and periodic commissioning (physical inspections and maintenance). HVAC systems that are producing and distributing the precise quantity of thermal energy needed in real-time to provide occupant comfort will attain a thermal balance performance level.

The potential energy savings unlocked by the systems and methods of the invention when retrofitted to existing HVAC equipment within a building goes well above 30% of the HVAC energy consumption. By combining advanced control algorithms to match the weather pattern with the thermal load requirement of the building in real-time, it becomes possible to deliver a much lower kW/ton ratio.

The systems and methods use relational-control algorithms to optimize all the equipment within an all-variable flow HVAC system (chillers, fans, pumps, etc.). By doing so, the systems and methods of the invention use the least amount of power required to maintain occupant comfort levels. Control set points are automatically calculated based on real-time building load information inputs and the weather conditions prevailing outside of the building. This approach results in a global thermal load management for the building instead of an equipment-based management strategy.

These relational-control systems and methods of the invention monitor the different parameters of the entire fleet of equipment and sensors 200 within a building to deliver continuous, automatic adjustments to the system based on the building load—regardless of facility type. The goal of these systems and methods is to generate energy usage savings (kWh/yr.), demand savings (kW), heating/cooling load (Therms), cooling tower water usage savings (gal/yr.), carbon footprint reduction (lbs./yr.) and Power Usage Effectiveness (PUE) Reduction. By doing so, these systems and methods save impressive amount of dollars, reduce the load on the grid and improve tenant comfort.

This global view of a building, combined with systems and methods, provides real-time system adjustment recommendations, identifies operational inefficiencies and provides 24/7 365 building re-commissioning. In some embodiments, this systems and methods manage energy demand by analyzing building occupancy, the building's thermodynamic patterns and outside weather to automatically adjust the heating and cooling of the building's different zones to the optimal levels in real-time.

According to an embodiment, the system comprises an edge computing device 100, provided locally and communicating with various local sensors 200 and HVAC components 400 directly or indirectly, and a remote server 300. The remote server 300 can be a single server, a plurality of servers wherein each one is dedicated to certain tasks, or a plurality of servers organized in a network to perform tasks in a distributed manner, e.g., the cloud.

Figure 3A:
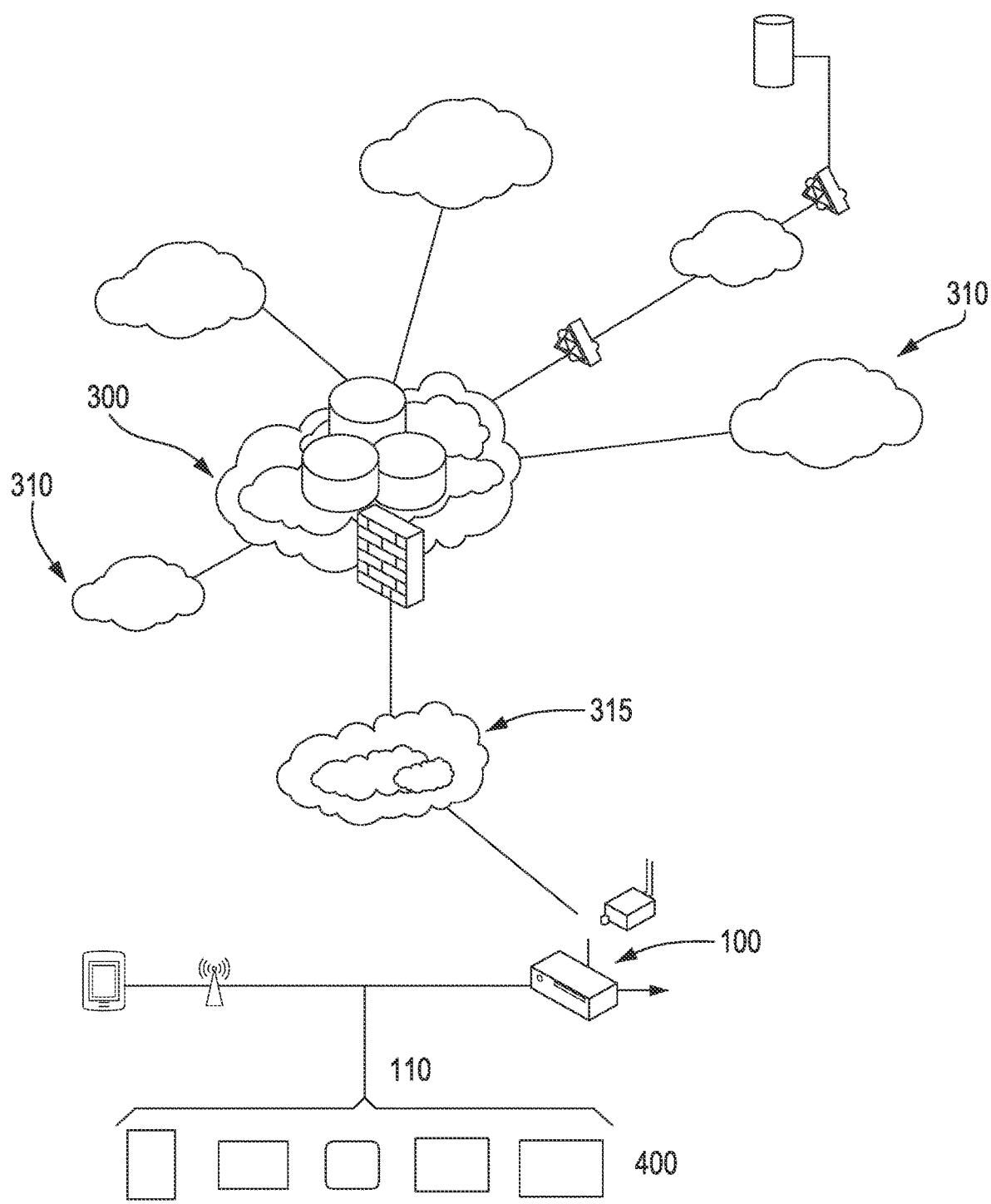
FIG. 3A is a schematic diagram illustrating exemplary architecture of the system, according to one embodiment of the invention.
Figure 3B:
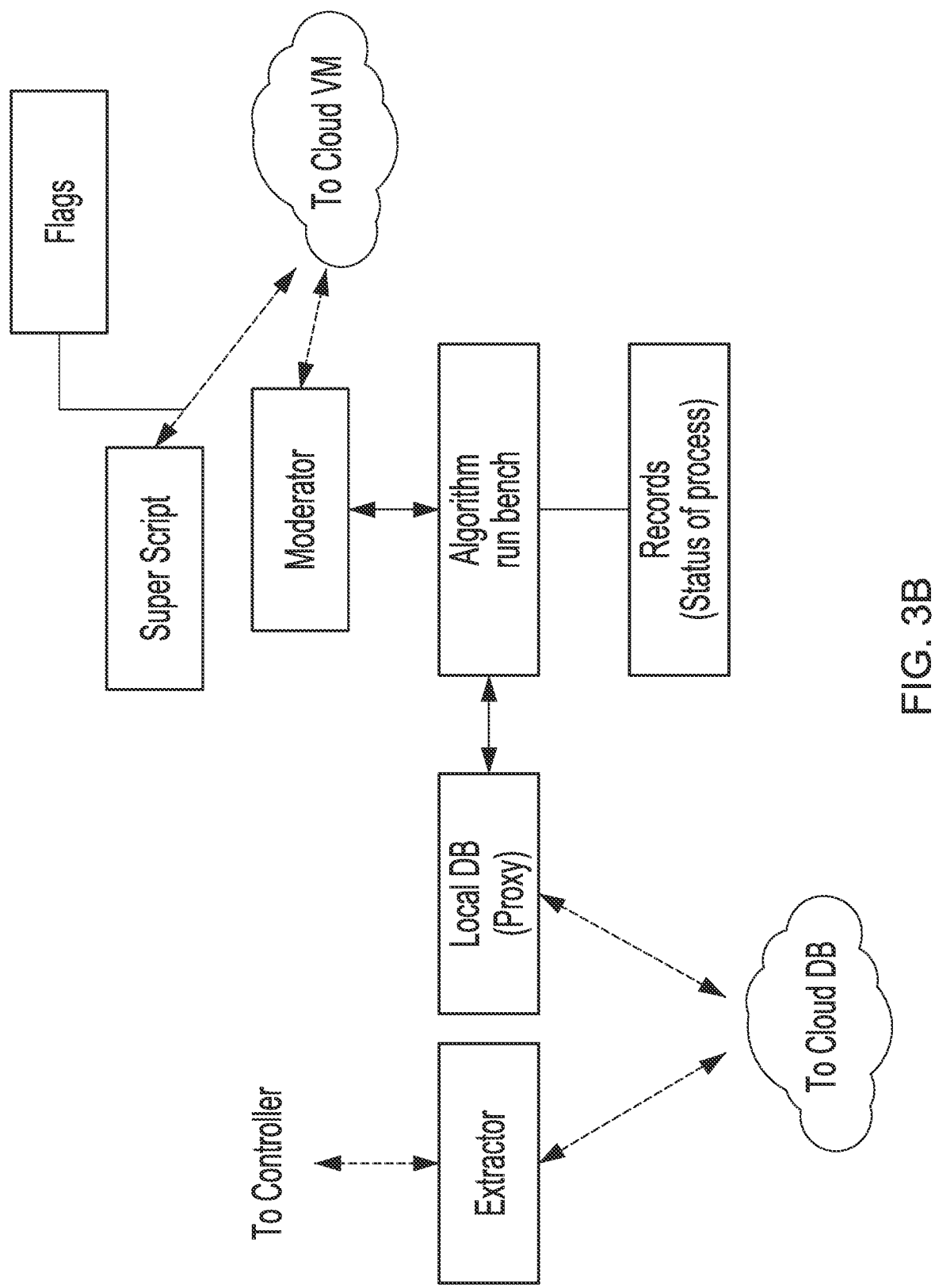
FIG. 3B is a flow chart illustrating the edge computing device smart ecosystem of the embodiment shown in FIG. 3A.

According to an embodiment, referring to FIG. 3, the edge computing device 100 locally collects and aggregates all the data points from various sensors 200 and sub-systems within the building including, but not limited to, the following data points: fans, electric meters, elevators, occupancy counters, steam meters, internal/external air temperatures, water, and more. To collect these data points, the edge computing device 100 connects to the existing BMS 105 systems over a variety of protocol (BACnet, Modbus, LonWorks, etc.). This edge computing device 100 is compatible with all the main BMS in the market (JCI, Schneider, Honeywell, Siemens, Automated Logic, Panasonic, Legrand, Delta, IBM, Hitachi,). An exemplary cloud solution server 300 network is connected to and collects data from the edge computing device 100 by a data link 315 and one or more other data sources including weather stations 310. The cloud solution server 300 includes one or more databases that store data from the edge computing device 100 and the one or more other data sources. Data from edge building is stored in a separate database. The system is optionally covered to update information in the database at set intervals and/or when a change data is observed. The cloud solution server 300 is operatively connected to the algorithm work bench 320.

Figure 4:
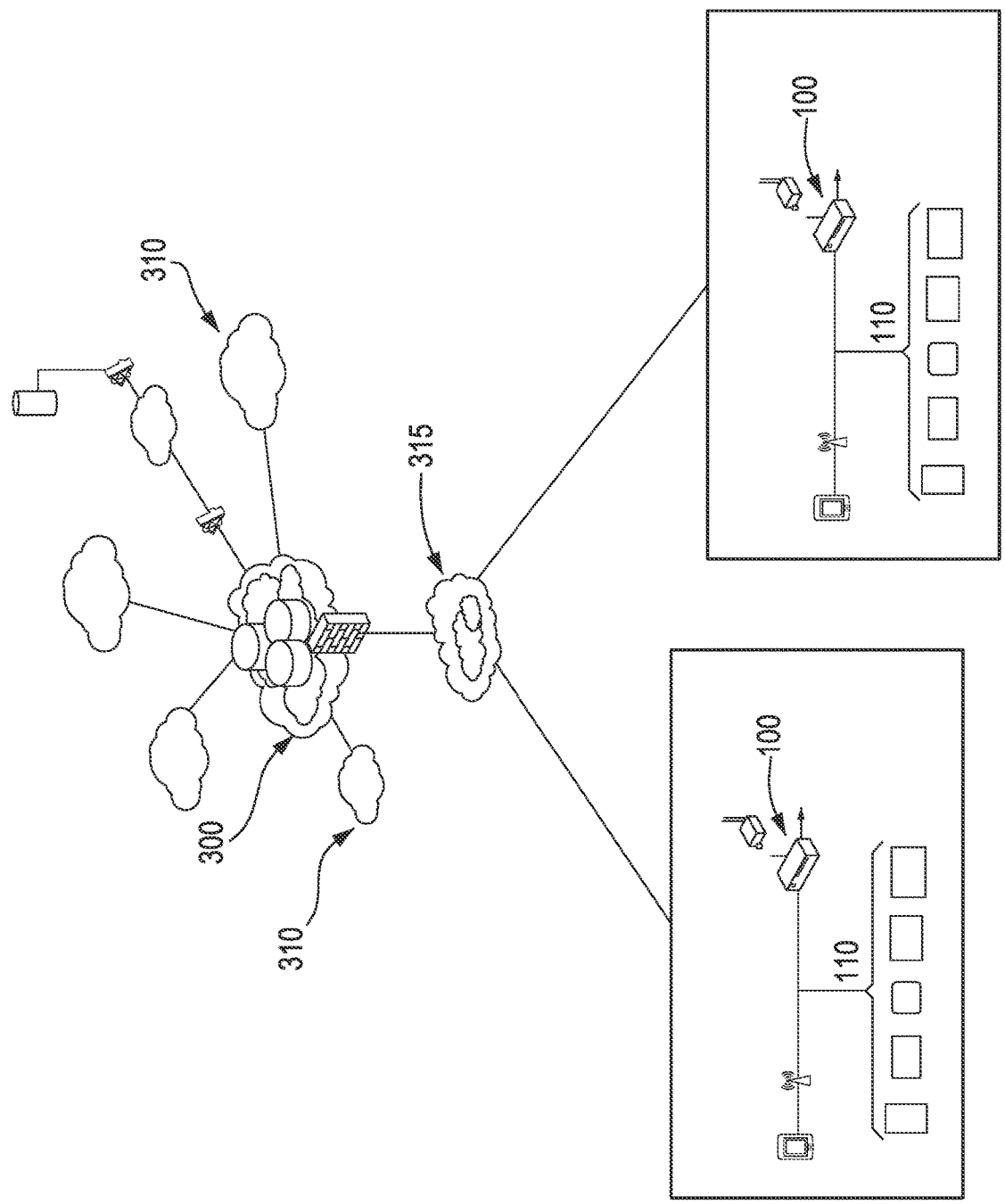
FIG. 4 is a schematic diagram illustrating another exemplary architecture of the system wherein multiple buildings are controlled, according to one embodiment of the invention, with each building having a dedicated edge computing device.
Figure 5A:
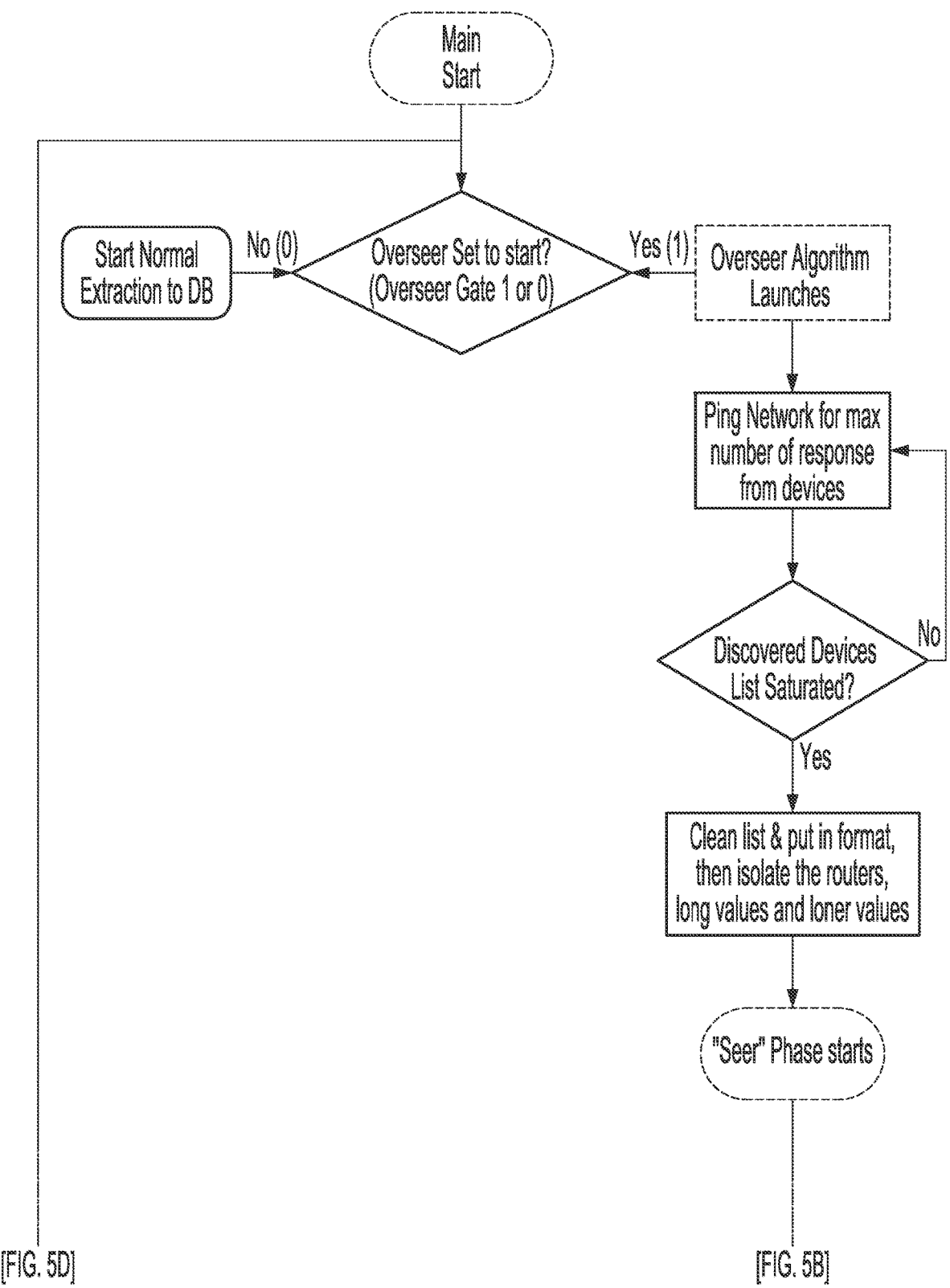
FIG. 5A to 5D is a flowchart illustrating the method of discovering data items ("points") in a computerized HVAC system of the algorithm "Overseer". Points include sensor measurements, actuator signals, and software points.
Figure 5B:
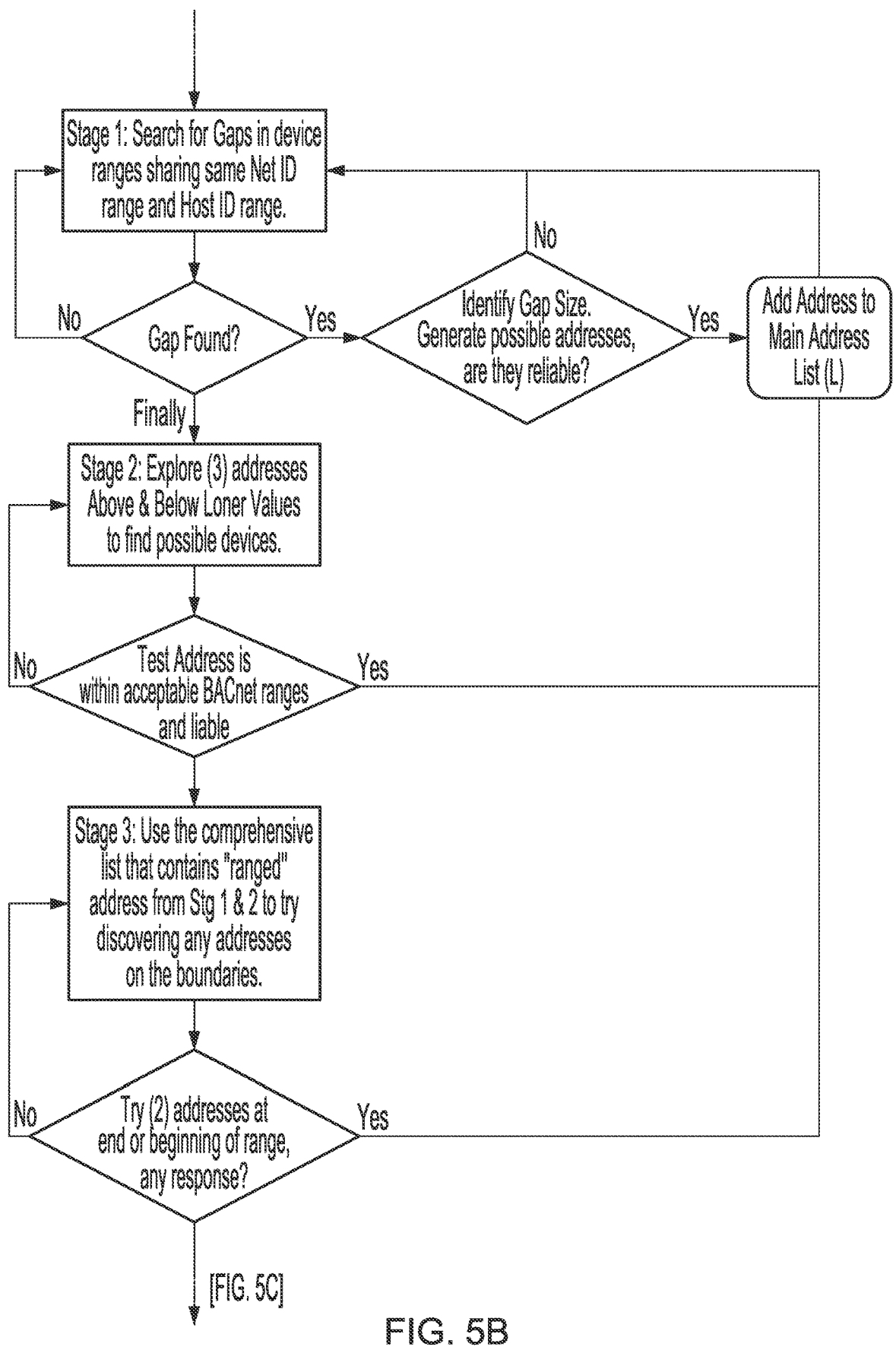
Figure 5C:
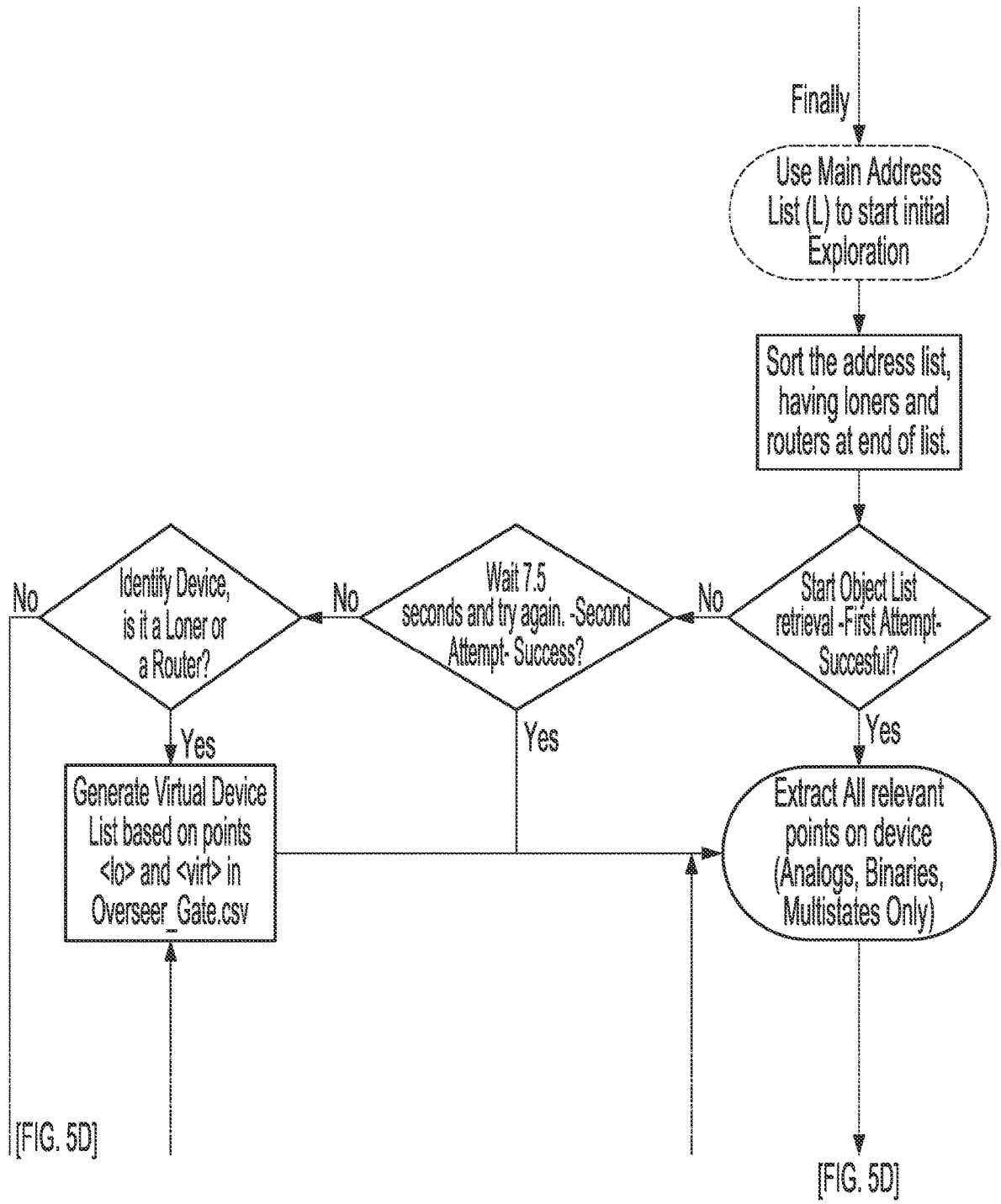
Figure 5D:
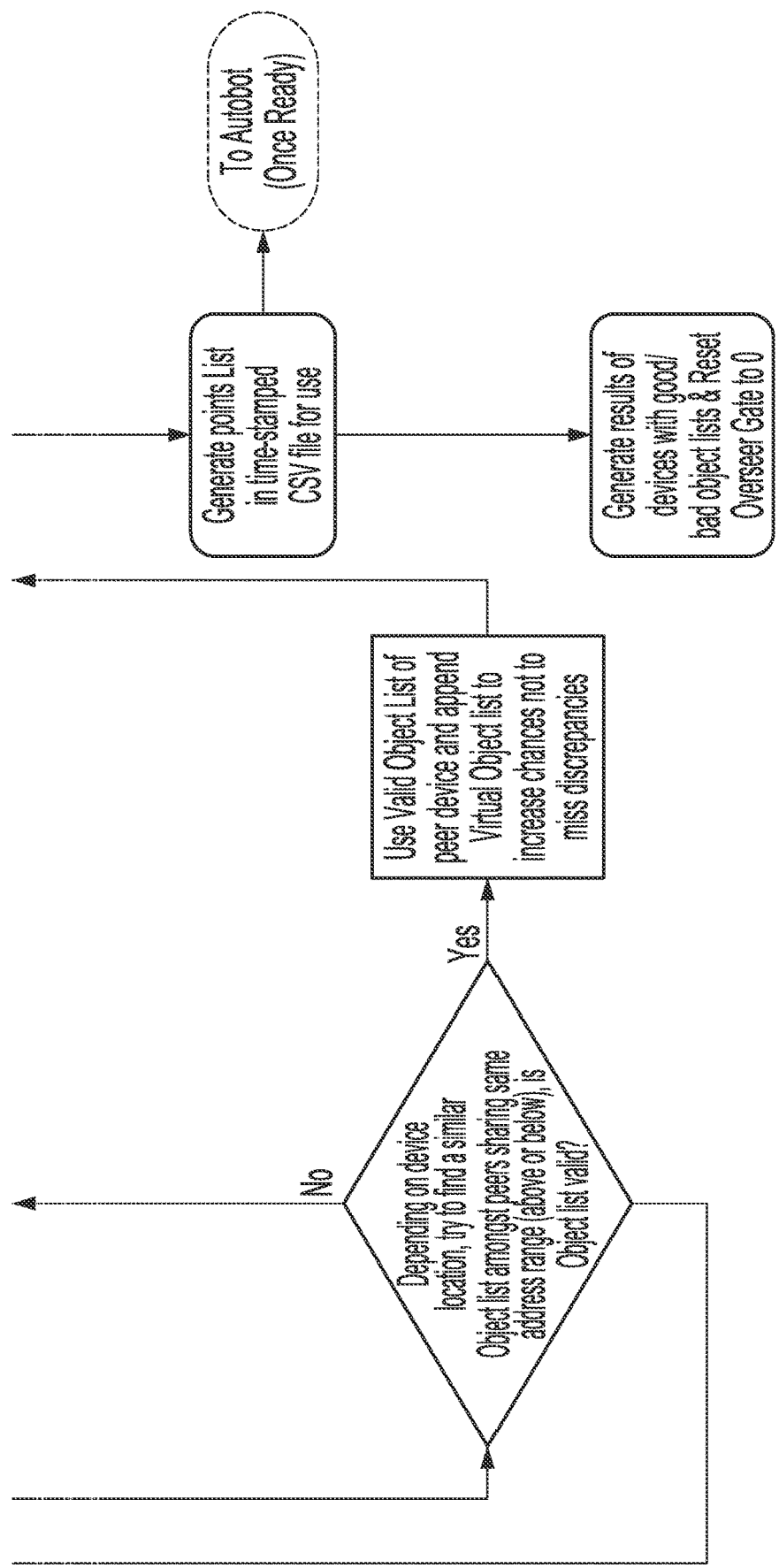
Figure 6C:
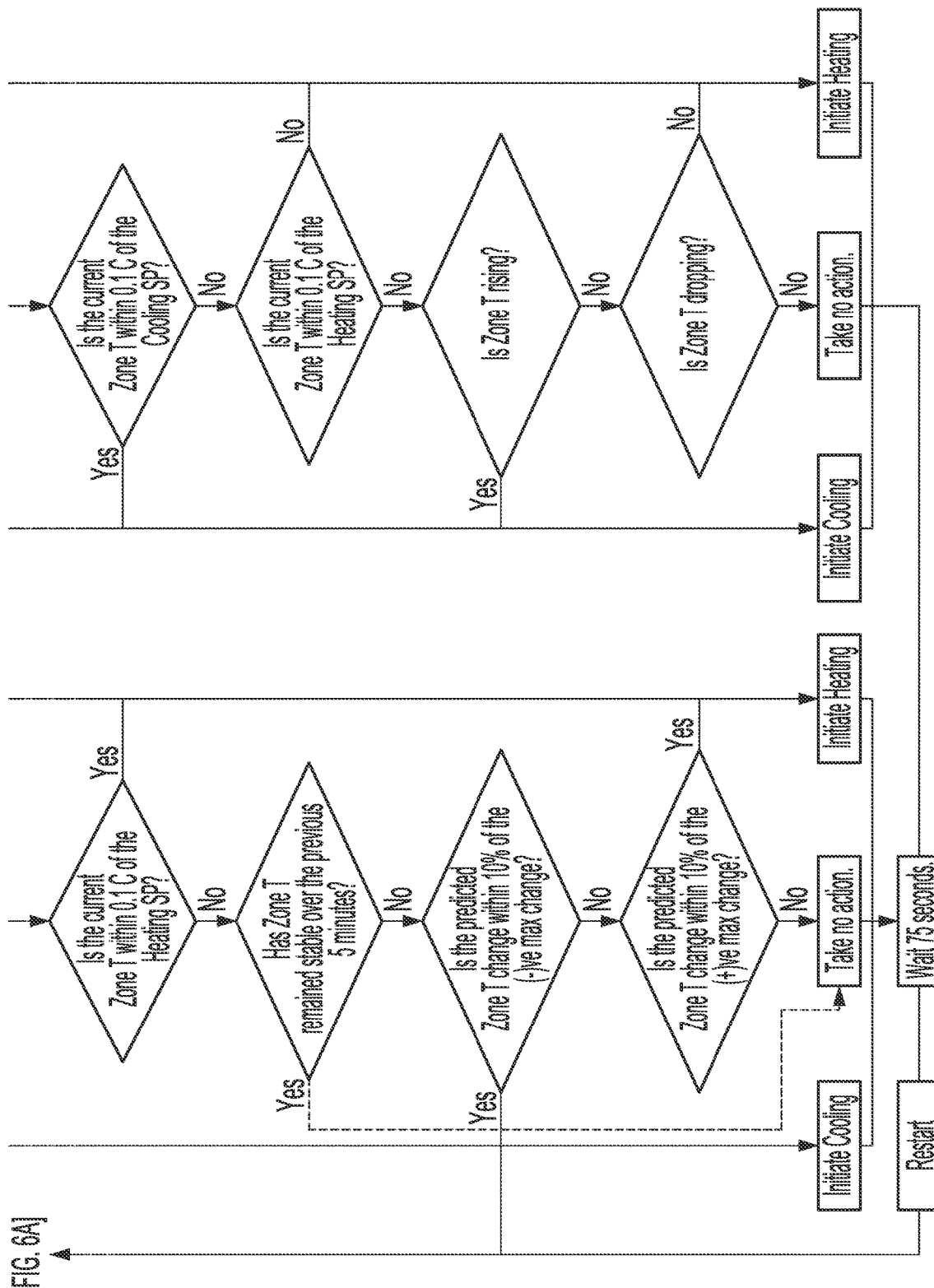
Figure 7A:
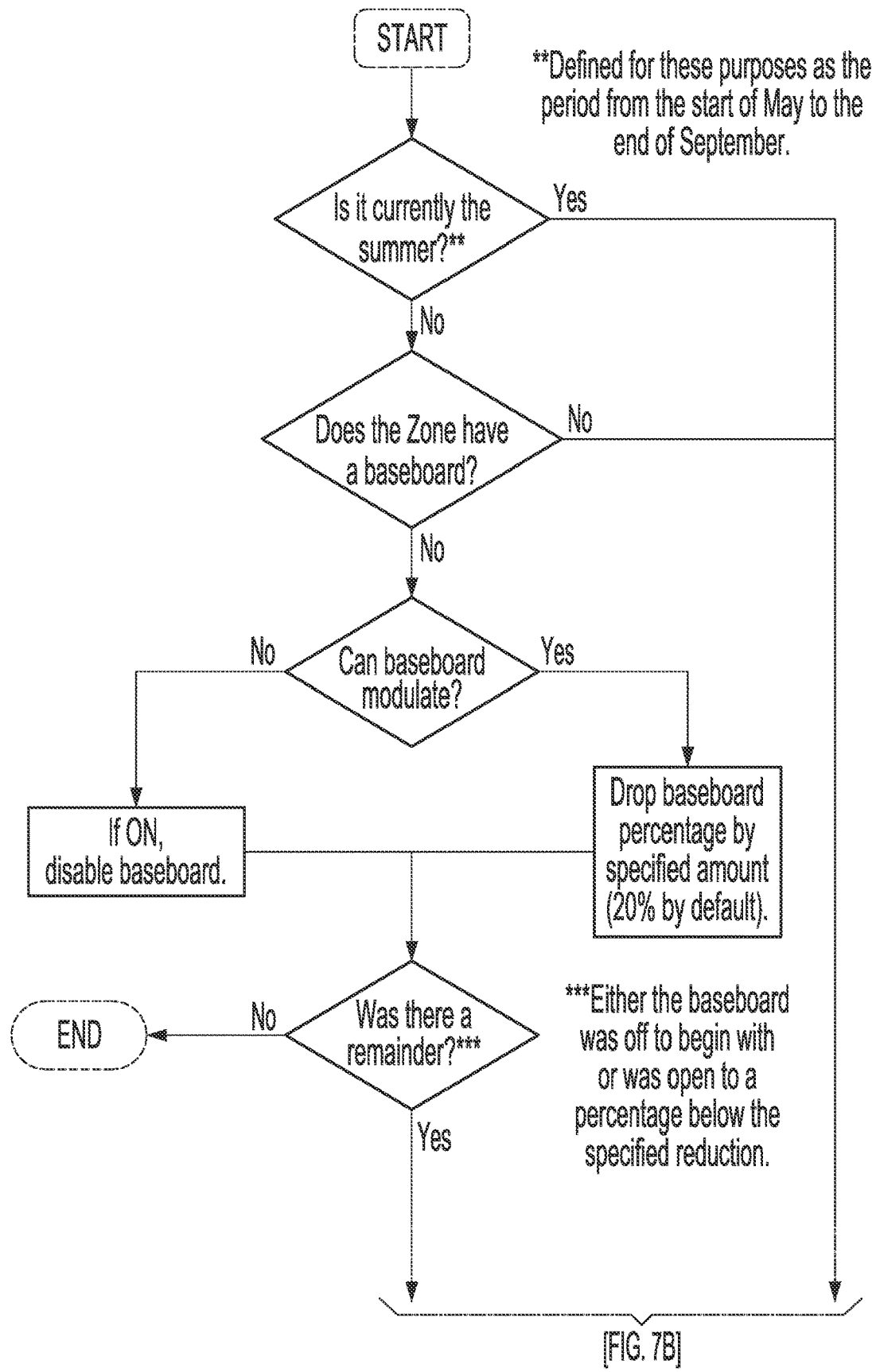
FIG. 7A to 7B is a flowchart illustrating control of cooling in accordance with one embodiment of the invention.
Figure 7B:
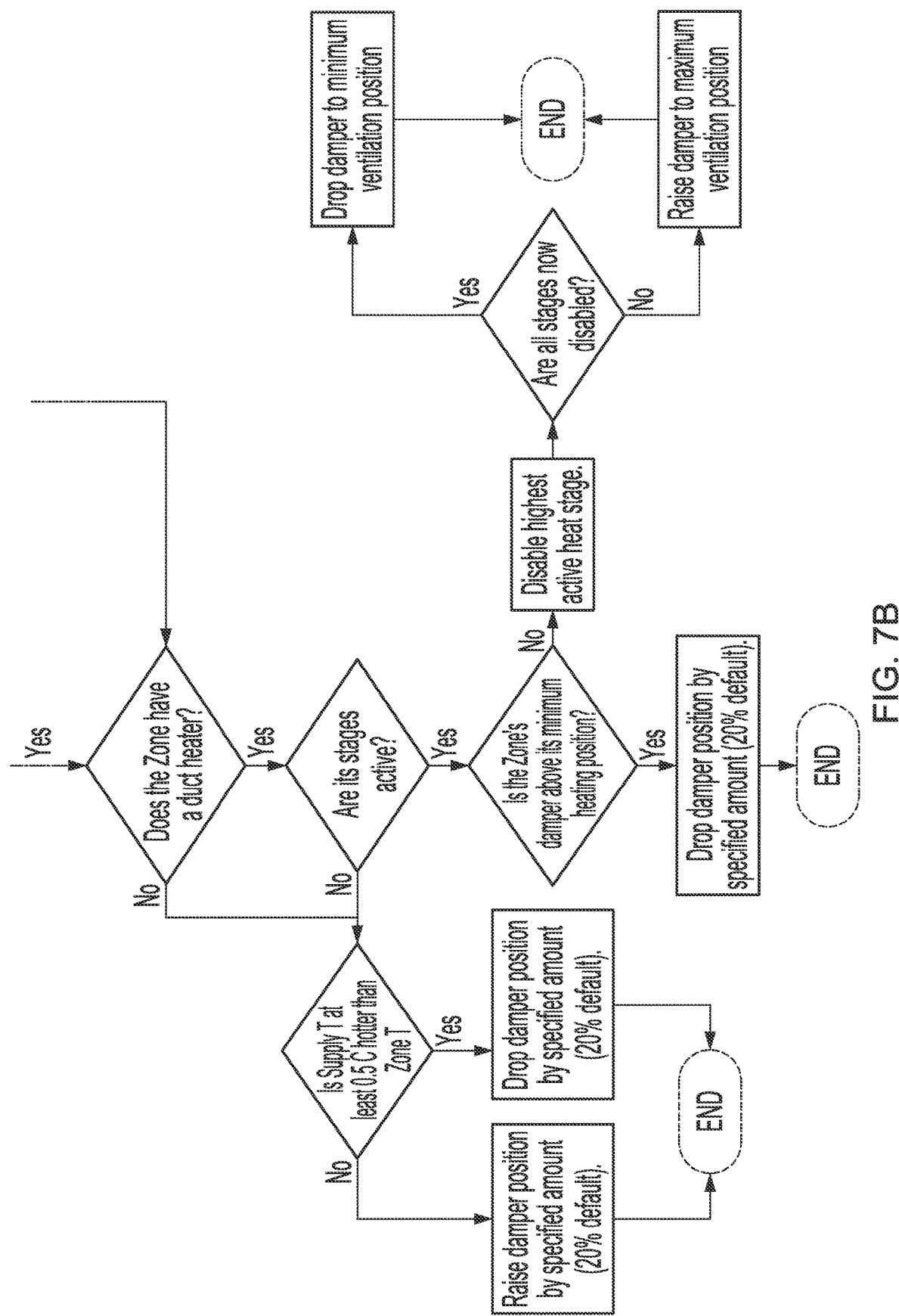
Figure 8A:
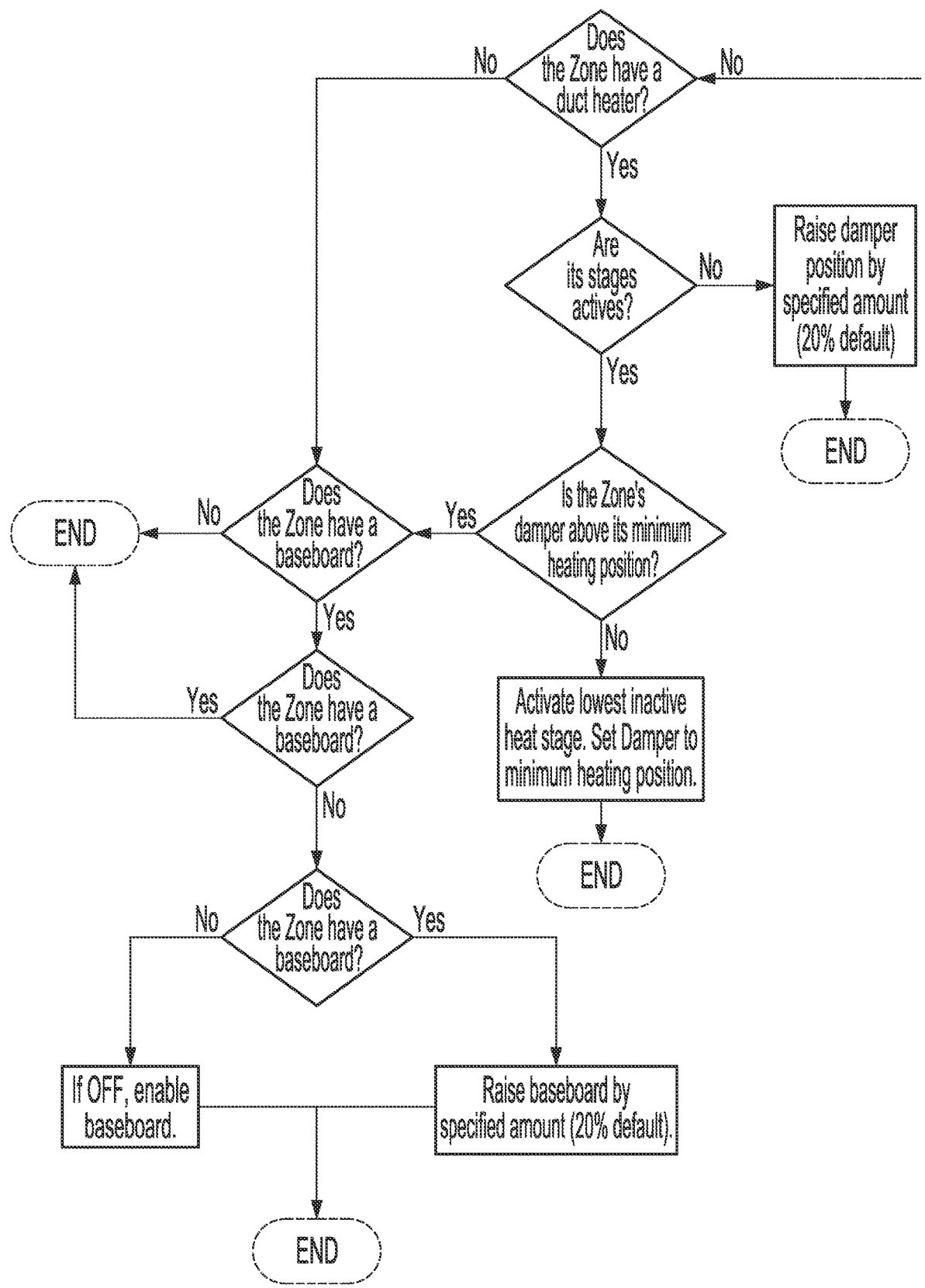
FIG. 8A to 8B is a flowchart illustrating control of heating in accordance with one embodiment of the invention.
Figure 8B:
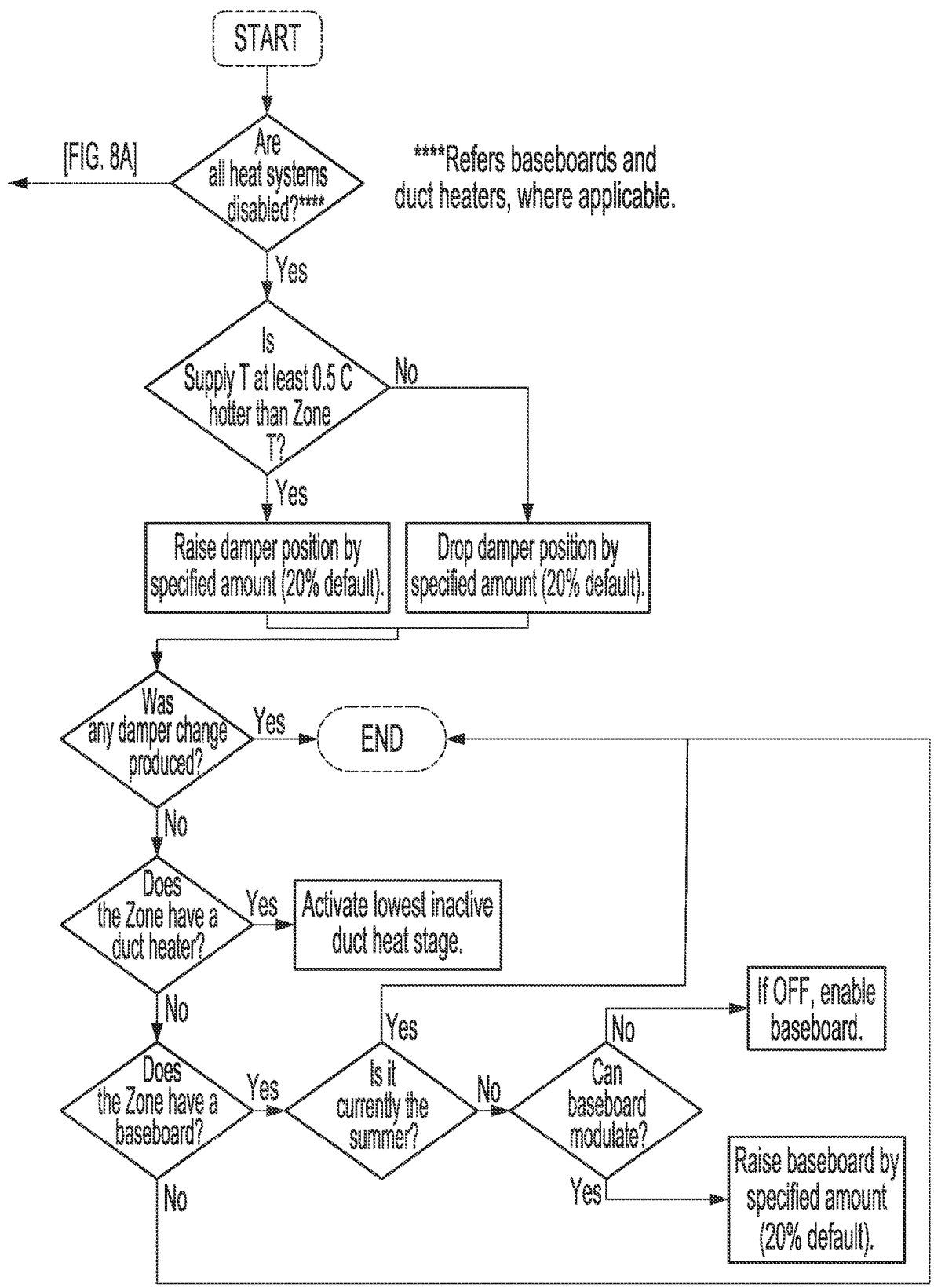
Figure 9:
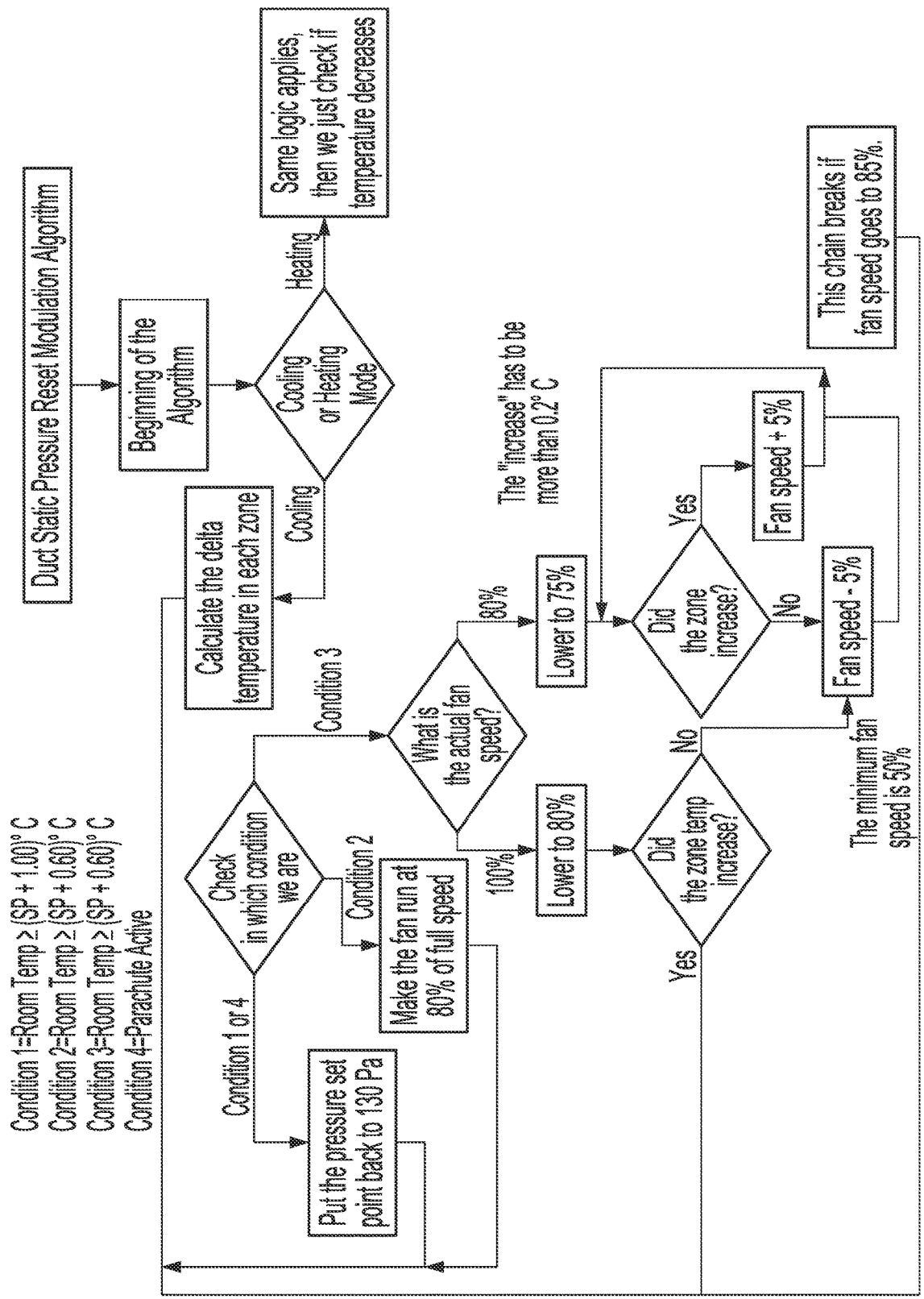
FIG. 9 is a flowchart illustrating control of Volume-Air-Volume (VAV) system in accordance with one embodiment of the invention.
Figure 10:
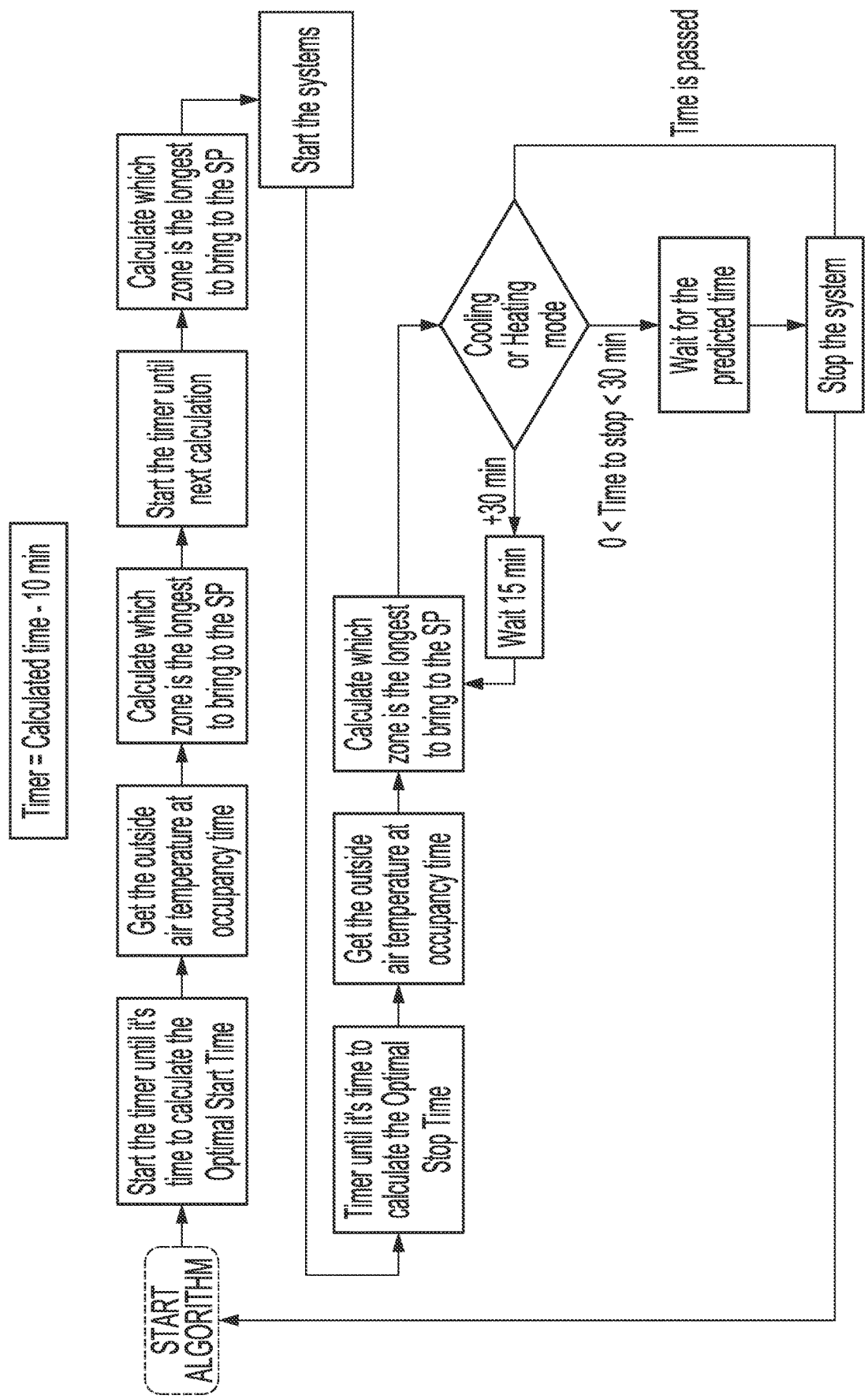
FIG. 10 is a flowchart illustrating determine optimal start time of heating and cooling systems for each heating and cooling zone.
Figure 11A:
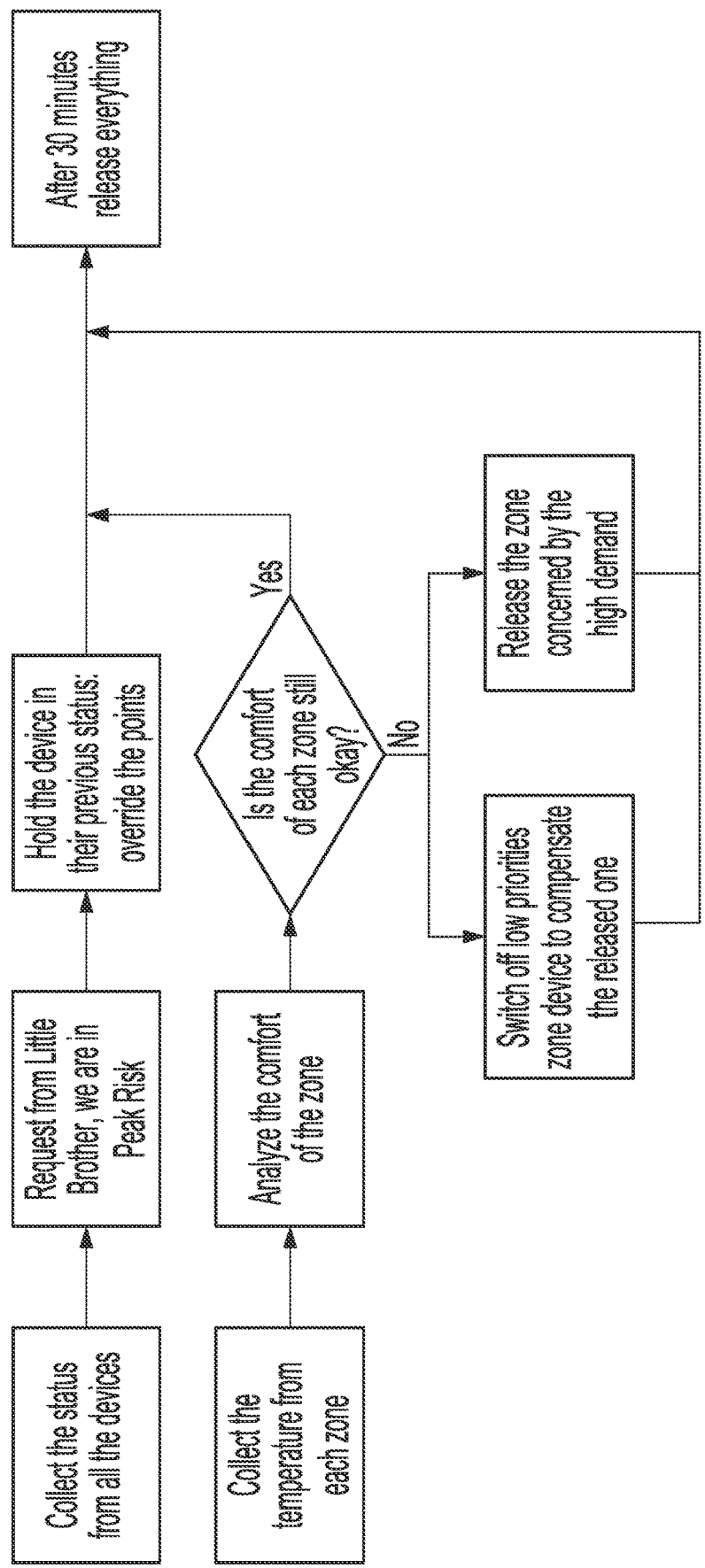
FIG. 11A is a flowchart illustrating electricity consumption and peak power monitoring and forecasting. Algorithm is referred to as "Big Brother"
Figure 11B:
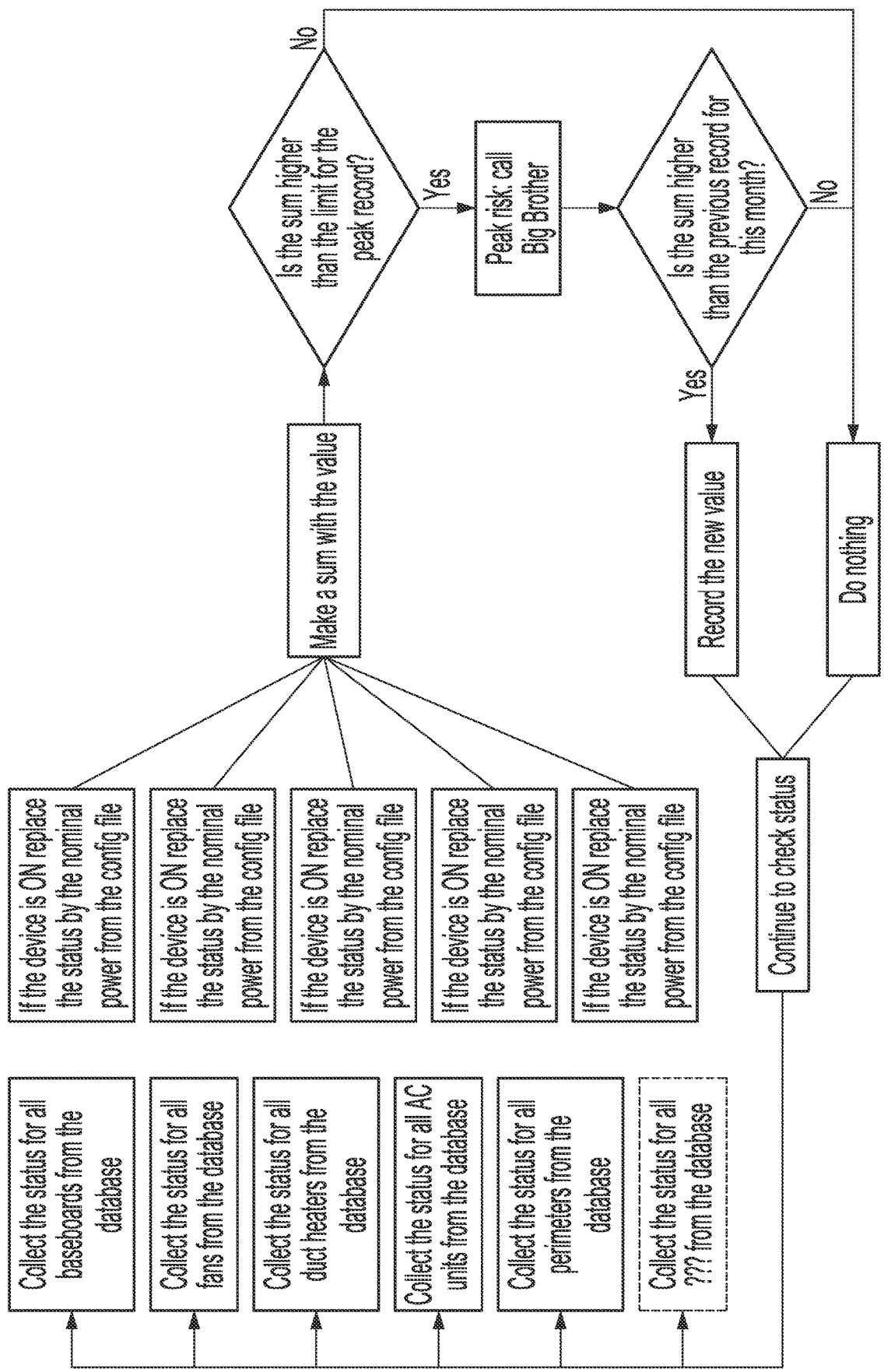
FIG. 11B is a flowchart illustrating electricity consumption and peak power monitoring and forecasting. Algorithm is referred to as "Little Brother"
Figure 12:
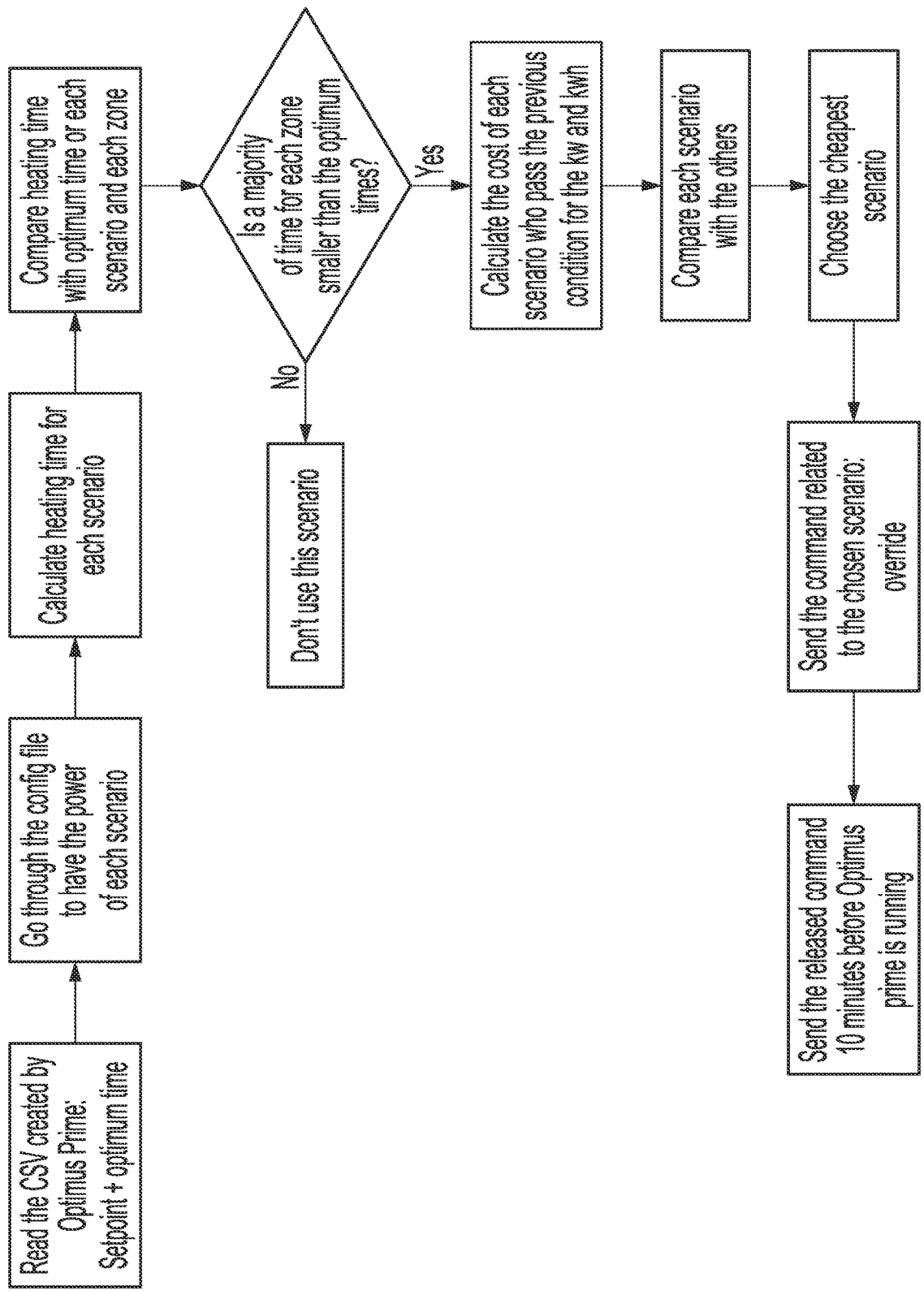
FIG. 12 is a flowchart illustrating peak shaving to reduce peak demand charge while complying to demand response events.
Figure 13:
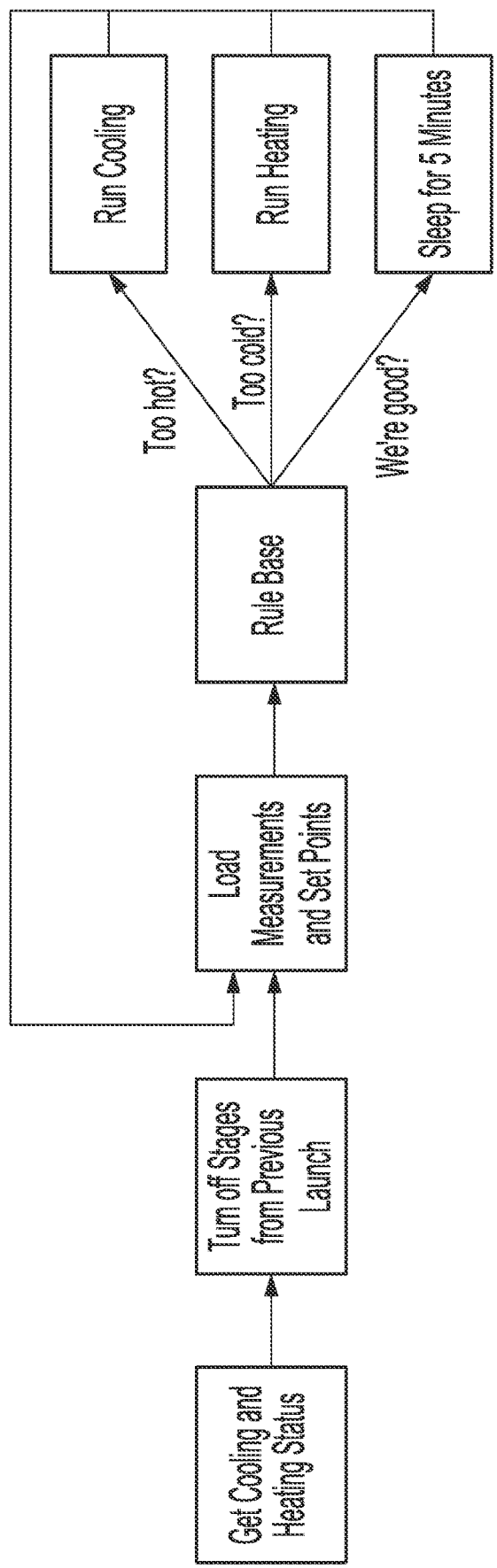
FIG. 13 is a flowchart illustrating master air handling to avoid simultaneous heating and cooling.

According to another embodiment, referring to FIG. 4. the cloud solution server 300 network collects data from multiple buildings, each one having their own edge computing device 100, 100, in communication with their respective electrical equipment, such as lighting, and with their respective HVAC controllers.

In one practical implementations, as shown in FIG. 1B, the edge computing device 100 communicates directly with the HVAC controller or BMS/BAS which, in turn, communicates with the components under its control. In an embodiment, the HVAC components 400 are controlled by the HVAC controller which communicates directly with the edge computing device 100. In another embodiment, the HVAC controller, which communicates directly with the edge computing device 100, controls both the HVAC components 400 and the sensors 200, in order to obtain all the measured values from the sensors and send them to the edge computing device 100, and to communicate with the HVAC components after having received instructions from the edge computing device 100.

According to an embodiment, the data collected by the edge computing device 100 from the variety of different sensors 200 located throughout the building is translated in a universal open format from the different protocols from which it is collecting the data, and sends the data to a database on a remote server 300, e.g., a cloud-computing database distributed on remote servers communicating in a network. This communication is preferably made over a wireless connection, and further preferably over an encrypted connection since private information can be collected by the sensors 200.

According to an embodiment, the database, preferably on a remote server 300 (e.g., on the cloud), aggregates all the data in an historic dataset and keeps a fine granularity of the historic time line for each data point. This database become overtime a big data picture of the thermodynamic behavior of the building and is used to extract additional value (e.g., trends) from the data set. Specific algorithms use the dataset to build a real time thermodynamic behavior models of the building including a prediction of the optimal settings of the different HVAC devices in real time.

Referring to FIG. 5A to 13, a collection of algorithms combines the thermodynamic model derived from the dataset with real-time value of the data point, the number of persons in each zone and the outside weather parameters condition in real-time and the forecast of the next few hours. The results of these algorithms calculation are a series of orders sent to the different controllers in the building that will dictate the modulation of all the HVAC devices to maintain the desire temperature and humidity level in the building at all time. These orders are the optimal settings for the next time interval (example: 5 minutes), once the time interval has elapse, a new calculation will be triggered to produce a new series of orders. This process run in continues mode and self-adjust base on the results of the previous order on the behavior of the HVAC equipment's.

According to an embodiment, the algorithms are distributed over the edge computing device 100 and the remote server 300 and 310. To optimize the response time in reason of network communication delays, some of the algorithms are executed on the edge computing device 100 and some are executed in the cloud.

For example, algorithms preferably executed on the edge computing device 100 may include those involving real time responses such as a sudden change of occupancy in a zone, and algorithms preferably executed on the remote server 300 involve those not related to real time responses, such as detecting trends and correlations between events and power demand, or applying weather forecasts to make power demand forecast. In other words, and in some embodiments, real-time operations are preferably performed locally and analytics is preferably performed remotely. Privacy of data can also be taken into account when deciding if data is communicated over the internet to a remote server 300 probably owned by a cloud provider.

In one embodiment of the invention, the dynamic thermal equilibrium process algorithms are divided in different subgroups related to their functions, for example, algorithms can be broadly divided into algorithms that specifically control air components of an HVAC, algorithms that specifically control water side components, and algorithms that increase energy efficiency and/or reduce energy costs, and algorithms the optimize control of the HVAC system. For example, in some embodiments, algorithms subgroups specifically instruct particular HVAC components with respect to:

the air systems managing the ventilation, modulation of the air temperature and humidity of the air flowing in the building;

the cooling systems producing and distributing the cooling thermal load in the building, serving in most cases the different air systems;

the heating systems producing and distributing the heating thermal load in the building, serving in most cases the different air systems; and the control systems.

Each of these subgroups has its own set of algorithms modeling the thermal flow of the building and calculating the optimal running configuration of the different HVAC device part of the subgroup. The following is a list of each algorithms per group:

Regarding air systems, the system is capable of performing the following operations (without limitation):

Modulate the fresh air intake base on the number of persons in each zone of the building.

Modulate the air flow speed base on the number of persons in each zone of the building.

Modulate the pressurization of each zone in function of the humidity control required (humidity control by pressurization of zones).

Modulate the duct static pressure in function of the fan speed and the VAV modulation.

Modulate the supply air fans, hood exhaust and make-up fans in function of the occupancy level.

Modulate the economy cycle (use outdoor air for space cooling) in function of the exterior parameters and inside load.

Modulate the night purge in function of weather parameter and forecast demand (flushing the building with cool outdoor air at night to avoid mechanical cooling at start-up).

Modulate the computer room air speed in function of cooling load (use air movement to remove heat load instead of supplying cold air to the room).

Modulate the humidification and de-humidification in function of the load.

Regarding cooling systems, the system is capable of performing the following operations (without limitation):

Modulate the staging of chillers and compressors in function of the load balance along the optimal curve of the chillers.

Modulate the chilled water pumps speed base on the number of persons in the building.

Modulate the water evaporator pump of the water tower base on the number of persons in the building.

Modulate the chilled water temperature and speed flow base on the number of persons, outside temperature and wet bulb.

Modulate the condenser water delivery temperature to maintain the optimal coolest possible CW for cooling of refrigeration equipment.

Modulate the head pressure control (for air cooled condensers & water tower only) to maintain the optimal condenser fans energy consumption.

Modulate the condensing pressure in function of the heat load to be extracted (for water-cooled condensers).

Regarding heating systems, the system is capable of performing the following operations (without limitation):

Modulate the hot water/steam delivery temperature in function of the heating demand load.

Modulate the boiler sequencing in function of the load demand.

Modulate losses in de-energized boilers.

Modulate the steam pressure in function of the load demand.

Regarding controls systems, the system is capable of performing the following operations (without limitation):

Modulate space temperature set points and control bands in function of the optimal range trend and deadband (albeit drifting).

Figure 2:
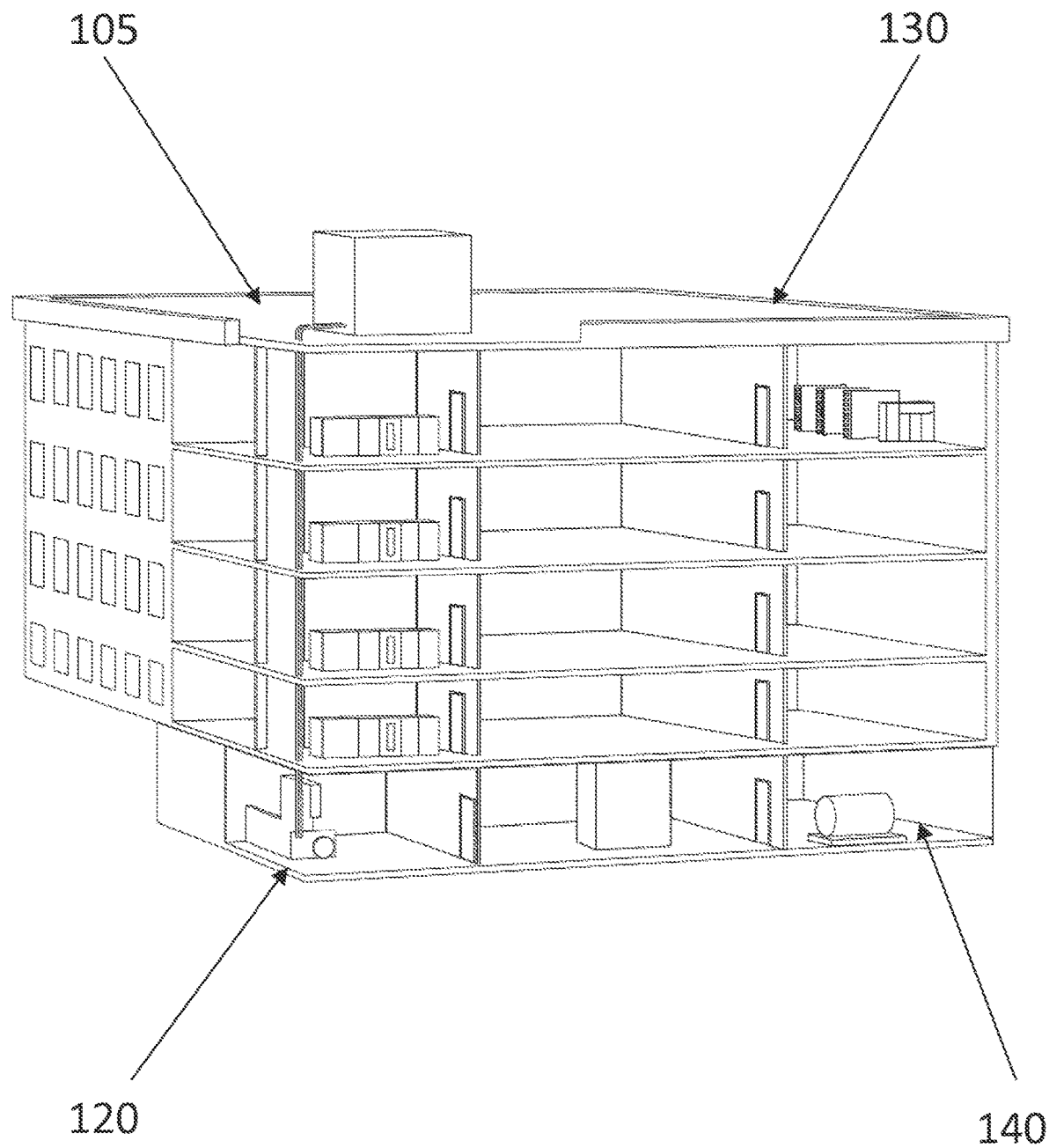
FIG. 2 is a schematic diagram illustrating various parameters in the building that can be controlled by the system, according to one embodiment of the invention, including cooling production optimization parameters 110, distribution optimization parameters 120; ventilation and air flow optimization parameters 130, and system control optimization parameters 140.

For example, in the embodiment shown in FIG. 2, the edge computing device using various algorithms dictate the control of the following parameters in the building without requiring physical modification of the building:

Cooling Production Optimization 105
- Variable head pressure control (air cooled condensers & water tower).
- Adjust condensing pressure base on heat load to be extracted.
- Variable head pressure control (water-cooled condensers).
- Adjust head pressure of the condenser water base on heat load to be extracted.
- Optimized secondary chilled water pumping.
- Balance the quantity of chilled water circulated base on the AHU needs (reduce circulation when low request).
- Humidity control in function of the outside humidity level.
- Predictive cooling production in function of the weather forecast (6 hours).
- Balance the chiller temperature base on the evaporator target.

Distribution Optimization 120
- Resetting chilled water delivery temperature.
- Set the optimal warmest possible water for cooling.
- Reset ting condenser water delivery temperature.
- Set the optimal coolest possible CW for cooling of refrigeration equipment.
- Reset ting heating hot water de livery temperature.
- Set the optimal coolest possible water for heating.
- Heating water Delta T modulated with Pressure Delta P.
- Staging of chillers and compressors.
- Load balance the chillers at the optimal efficiency curve.

Ventilation and Air Flow Optimization 130
- Supply air fans, hood exhaust and make-up fans.
- Reduce usage when not needed (occupancy driven).
- Use outdoor air for space cooling when possible.
- Night purge.
- Demand control ventilation base on controlling $CO_2$ for occupied space.
- Preemptive cooling or heating in function of sun position.
- Preemptive cooling or heating in function of the number of persons in a zone.
- Demand control ventilation base on controlling CO levels.
- Duct static pressure reset.
- Reduce fan speed in proportion of VAV modulation.
- Use air movement to remove heat load instead of supplying cold air to the room.

System Control Optimization (140)
- Occupancy control.
- Automatic switching of ventilation system and lights if the presence of occupants in the area is detected.
- Optimum start/stop heating/cooling for each zone.
- Space temperature set points and control bands.
- Set the optimal range trend and deadband.
- Master air handling unit supply air temperature signal.
- Modulate master air feed temperature to avoid simultaneous heating and
- Cooling.

Examples of sensors 200 provided in a building include, without limitation, temperature sensors (often in a thermostat), occupancy sensors, humidity sensors, pressure sensors, and sensors found within the HVAC system such as air speed sensors.

Other data not measured by the sensors 200 can be collected and used. For example, online calendars may be queried to detect upcoming events in particular locations in the building. In another example, the remote server 300 can query third party servers 600, as shown in FIG. 1A and FIG. 1B, to collect weather forecasts for the location of the building, and take into account sunlight, temperature, wind, humidity, pressure and precipitation of the environment around the building to feed to the thermodynamic model of the building being computed by the remote server 300. For example, a given zone in the building may receive more sunlight than another and the remote server 300 may determine that an optimal course of action would be to trigger ventilation to have the air flow from one zone to another zone to warm the other zone without having to resort to the heating system and cool down the sunlit zone without needing the air conditioning system.

Example 1: Impact of Pre-Emptive HVAC Control on Energy Cost Spending

An embodiment of the methods and systems of the invention was tested in two retail chain stores to reduce overhead costs, reduce management time and effort spent resolving HVAC operating issues while reducing the retail store's carbon footprint without a significant initial financial investment or change to its current/legacy HVAC systems.

Heating and ventilation costs make up a significant portion of store's monthly operating costs. HVAC optimization can reduce these operating costs.

HVAC operations in a retail chain store environment can impacted by its operating hours, store infrastructure and customer traffic.

The edge computing device at the building was located near the existing HVAC controller. The exact location of the edge computing device was decided base on the availability of electricity and a minimum cell coverage to transmit to the cloud.

Once installed, the edge computing device was connected to the existing HVAC controller. Once the connection was established, the controller type communication library was used to connect to the existing controller. At that point, the Overseer algorithm (FIG. 5A to 5D) was launched to find all the points, data items or "points" including sensor measurements, actuator signals and software values on the network to build the list of points aggregated by controller device.

The list generated by Overseer was transferred to Autobot for automatic mapping of all the points names and point tag definition. Mapping was completed manually as necessary. Once the mapping was completed, the extractor started the extraction process and the cloud tables were created for that building.

Test Locations:

The first test location was a retail chain store located in Montreal, Québec, Canada with a total interior area: 13,635 sq. ft. (Retail: 11,135 sq. ft., Stock: 2,500 sq. ft.). The hours of operation of the first store were 8:00 AM-9:00 PM Monday-Friday, 8:00 AM-5:00 PM Saturday-Sunday.

The first test location was a retail chain store located in Ville Saint-Laurent, Québec, Canada with a total interior area: 11,350 sq. ft. (Retail: 8,830 sq. ft., Stock: 2,440 sq. ft.). The hours of operation of the first store were 8:00 AM-9:00 PM Monday-Friday, 8:00 AM-5:00 PM Saturday-Sunday.

Observation Phase:

An initial observation phase of 7 months was conducted to understand the current HVAC system's reactive tendencies, the retail environments' unique patterns/requirements and the issues/challenges faced by the legacy HVAC systems. The data from the observation phase was used for training of the AI algorithms in a retail environment and provided the base operating parameters used in the deployment of the systems and methods of the invention.

Data collected included temperature set points for cooling, equipment cycling routines, equipment failure detection, roof-top unit (RTU) heating and cooling patterns and peak power shaving opportunities. Data was collected using the edge device system and three intelligent thermostatic sensors that communicate with three RTUs.

Test Phase:

The methods of the invention used historical data to transform the stores current HVAC system from being reactive to changing conditions to being proactive and pre-emptive.

The method of the invention was tested using the following:

1. An HVAC Optimization Tool that optimized HVAC system stops and starts using pre-set parameters (based upon regression analyses and historical data) and external parameters (e.g. weather and occupancy rates).

2. An Energy Consumption Calculator that tabulates energy consumption patterns based upon data analysis.

3. Pre-emptive Heating Regulator that enabled the HVAC system to avoid peak electricity consumption and choosing between different heating devices based upon which one will obtain the desired set point faster and at the lowest cost.

Results:

The energy savings observed during the month-long test period was 28% for the first retail store and 31% for the second store.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A system for managing HVAC components of a building, the system comprising:
    an edge computing device in communication with sensors of environmental variables in the building and with the HVAC components, the edge computing device comprising a first memory and a first processor to execute first instructions stored on the first memory;
    a remote server in communication with the edge computing device through a data link over a network, the remote server comprising a second memory and a second processor to execute second instructions stored on the second memory, the second instructions causing the remote server to:
        receive, through the data link, sensor data from the edge computing device, the sensor data having been collected and transmitted by the edge computing device from sensors in a plurality of zones in the building; and
        execute a first subgroup of algorithms stored on the second memory to:
            analyze the sensor data from the edge computing device;
            determine, based on the analytics of the sensor data, a plurality of macro parameters including a forecast of needs in heating, cooling and ventilation for each zone in the plurality of zones within the building for a first time period; and
            send the plurality of macro parameters to the edge computing device;
    and the first instructions causing the edge computing device to:
        collect the sensor data from the sensors in the plurality of zones in the building;
        transmit the sensor data to the remote server;
        receive the plurality of macro parameters for each zone in the plurality of zones within the building for the first time period from the remote server;
        execute a second subgroup of algorithms stored on the first memory to determine, based on the plurality of macro parameters, micro parameters comprising a plurality of forecast values for at least one command point of the HVAC components of the plurality of zones within the building for a second time period, the second time period being of a shorter duration than the first time period; and
        instruct the HVAC components on how to operate using the micro parameters;
    wherein the first subgroup and the second subgroup of algorithms are distributed over the edge computing device and the remote server in order to optimize a response time to the HVAC components, such that: the macro parameters determined based on the first subgroup of algorithms executed by the remote server relate to analytics within the first time period, and the micro parameters determined based on the second subgroup of algorithms executed by the edge computing device relate to real-time operations within the second time period; and
    wherein when the data link between the edge computing device and the remote server fails, the analytics of the sensor data and the determination of the macro parameters is performed by the edge computing device.

2. The system of claim 1, wherein the first instructions are further executable to run an artificial intelligence engine to predict operating values for the HVAC components based on the macro parameters and to run dynamic modulation algorithms with the predicted operating values for the HVAC components to determine HVAC instructions.

3. The system of claim 2, wherein the second time period is between 10 and 20 minutes.

4. The system of claim 1, wherein the collected data from the edge computing device includes historical data and wherein the system is trained based on the historical data.

5. The system of claim 1, wherein the edge computing device is in direct communication with at least one of the sensors and the HVAC components.

6. The system of claim 1, wherein the edge computing device communicates with at least one of the sensors and the HVAC components via a master controller or a slave controller.

7. The system of claim 1, wherein the system is configured for retrofitting into an existing building.

8. The system of claim 1, wherein the remote server is further in communication with one or more third-party servers and queries data from the third-party servers over the internet to be used to determine the plurality of macro parameters.

9. The system of claim 8, wherein the third-party server provides at least one of: meteorological information, sunlight phase information, occupancy information and sun path information.

10. The system of claim 1, wherein the operating values for the HVAC components are determined to minimize energy consumption in the building.

11. The system of claim 1, wherein the remote server aggregates the sensor data from the edge computing device in a history dataset to build a thermodynamic behavior model of the building.

12. The system of claim 1, wherein the edge computing device is further configured to define in real time a control sequence to instruct the HVAC components on how to operate.

13. The system of claim 1, wherein the system is configured to detect anomalous or abnormal behavior.

14. A computer-implemented method for managing HVAC components of a building, the method comprising:
   collecting sensor data from sensors of environmental variables in a plurality of zones in the building by an edge computing device provided in the building;
   sending, by the edge computing device, at least a portion of the sensor data to a remote server in communication with the edge computing device through a data link;
   receive, by the remote server, the sensor data from the edge computing device through the data link; and
   executing a first subgroup of algorithms stored on the remote server to:
      analyze the sensor data from the edge computing device;
      determine, by the remote server based on the analytics of the sensor data, macro parameters including a forecast of needs in heating, cooling and ventilation for each zone in the plurality of zones within the building a first time period; and
      send the macro parameters for each zone in the plurality of zones within the building to the edge computing device;
   executing a second subgroup of algorithms stored on the edge computing device to determine, by the edge computing device based on the macro parameters for each zone in the plurality of zones within the building, micro parameters to operate the HVAC components, the micro parameters comprising a plurality of forecast values for at least one command point of the HVAC components of the plurality of zones within the building for a second time period, the second time period being of a shorter duration than the first time period; and
   instructing the HVAC components on how to operate using the micro parameters, by the edge computing device;
   wherein the first subgroup and the second subgroup of algorithms are distributed over the edge computing device and the remote server in order to optimize a response time to the HVAC components, such that: the macro parameters determined based on the first subgroup of algorithms executed by the remote server relate to analytics within the first time period, and the micro parameters determined based on the second subgroup of algorithms executed by the edge computing device relate to real-time operations within the second time period; and
   wherein when the data link between the edge computing device and the remote server fails, the analytics of the sensor data and the determination of the macro parameters is performed by the edge computing device.

15. The method of claim 14, where said collecting data from the sensors comprises collecting data from existing sensors, and said instructing the HVAC components comprises instructing existing HVAC components.

16. The method of claim 15, wherein the collected data includes historical data and wherein the method is trained based on the historical data.

* * * * *